(12) United States Patent
Li et al.

(10) Patent No.: US 11,101,955 B2
(45) Date of Patent: Aug. 24, 2021

(54) CHANNEL STATE INFORMATION TRANSMISSION METHOD, TERMINAL DEVICE, AND NETWORK DEVICE

(71) Applicant: HUAWEI TECHNOLOGIES CO., LTD., Guangdong (CN)

(72) Inventors: Xueru Li, Beijing (CN); Jianqin Liu, Beijing (CN); Kunpeng Liu, Beijing (CN); Bingyu Qu, Beijing (CN); Yongxing Zhou, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 51 days.

(21) Appl. No.: 16/579,647

(22) Filed: Sep. 23, 2019

(65) Prior Publication Data
US 2020/0044803 A1 Feb. 6, 2020

Related U.S. Application Data

(63) Continuation of application No. PCT/CN2018/080242, filed on Mar. 23, 2018.

(30) Foreign Application Priority Data
Mar. 24, 2017 (CN) .......................... 201710184871.7

(51) Int. Cl.
*H04L 5/00* (2006.01)
*H04B 7/0413* (2017.01)
*H04B 7/06* (2006.01)

(52) U.S. Cl.
CPC .......... *H04L 5/0048* (2013.01); *H04B 7/0413* (2013.01); *H04B 7/0626* (2013.01); *H04B 7/0632* (2013.01); *H04B 7/0634* (2013.01)

(58) Field of Classification Search
CPC .... H04B 7/0413; H04B 7/0626; H04B 7/063; H04B 7/0632; H04B 7/0634; H04B 7/0639; H04L 5/0048
See application file for complete search history.

(56) References Cited

U.S. PATENT DOCUMENTS

| 7,873,710 B2 | 1/2011 | Kiley et al. | |
| 2007/0281746 A1* | 12/2007 | Takano | H04B 7/0634 455/562.1 |
| 2011/0306383 A1* | 12/2011 | Lee | H04W 72/02 455/522 |

(Continued)

FOREIGN PATENT DOCUMENTS

| CN | 101615979 A | 12/2009 |
| CN | 102111246 A | 6/2011 |

(Continued)

*Primary Examiner* — Wutchung Chu
(74) *Attorney, Agent, or Firm* — Womble Bond Dickinson (US) LLP

(57) ABSTRACT

Embodiments of this application provide a channel state information transmission method, a terminal device, and a network device. The method includes: sending, by a terminal device, a first reference signal through a first antenna port set, where the first antenna port set includes n antenna ports; receiving, by the terminal device, a second reference signal through a second antenna port set, where the second antenna port set includes N antenna ports, and the first antenna port set is a proper subset of the second.

20 Claims, 3 Drawing Sheets

(56) References Cited

U.S. PATENT DOCUMENTS

| | | | | |
|---|---|---|---|---|
| 2012/0014349 A1* | 1/2012 | Chung | ................ | H04B 7/0693 |
| | | | | 370/329 |
| 2012/0127878 A1* | 5/2012 | Kim | .................... | H04B 7/0608 |
| | | | | 370/252 |
| 2013/0315337 A1 | 11/2013 | Dai et al. | | |
| 2014/0003240 A1* | 1/2014 | Chen | ....................... | H04L 5/14 |
| | | | | 370/235 |
| 2014/0295909 A1* | 10/2014 | Ouchi | .................. | H04W 52/40 |
| | | | | 455/522 |
| 2014/0341146 A1* | 11/2014 | Nakashima | ........ | H04W 72/042 |
| | | | | 370/329 |
| 2015/0124673 A1* | 5/2015 | Ouchi | ................ | H04W 52/362 |
| | | | | 370/311 |
| 2016/0020846 A1 | 1/2016 | Wang et al. | | |
| 2016/0080052 A1* | 3/2016 | Li | ....................... | H04B 7/0632 |
| | | | | 375/267 |
| 2016/0192229 A1* | 6/2016 | Liu | ....................... | H04L 1/0026 |
| | | | | 455/423 |
| 2016/0204921 A1* | 7/2016 | Kim | .................... | H04B 7/0469 |
| | | | | 370/312 |
| 2016/0211902 A1* | 7/2016 | Park | .................... | H04B 7/0456 |
| 2016/0241371 A1* | 8/2016 | Kim | .................... | H04B 7/0478 |
| 2016/0344465 A1 | 11/2016 | Wang et al. | | |
| 2016/0359538 A1* | 12/2016 | Onggosanusi | ........ | H04L 5/0057 |
| 2016/0380734 A1 | 12/2016 | Wang et al. | | |
| 2017/0126376 A1 | 5/2017 | Wang et al. | | |
| 2017/0141827 A1 | 5/2017 | Liu et al. | | |
| 2017/0164226 A1* | 6/2017 | Wei | .................... | H04W 72/085 |
| 2017/0195031 A1* | 7/2017 | Onggosanusi | ........ | H04B 7/0626 |
| 2017/0244462 A1* | 8/2017 | Wei | .................... | H04B 7/0478 |
| 2017/0257884 A1* | 9/2017 | Rahman | ................ | H04B 7/061 |
| 2017/0264390 A1 | 9/2017 | Liu et al. | | |
| 2018/0006845 A1* | 1/2018 | Kim | .................... | H04B 7/0626 |
| 2018/0041258 A1* | 2/2018 | Tong | ........................ | H04L 1/06 |
| 2018/0062724 A1* | 3/2018 | Onggosanusi | ........ | H04B 7/0413 |
| 2018/0206132 A1* | 7/2018 | Guo | ........................ | H04B 7/02 |
| 2018/0220406 A1* | 8/2018 | Mizusawa | ................ | H04B 7/04 |
| 2018/0263045 A1* | 9/2018 | Zhou | .................... | H04B 7/0617 |
| 2018/0278316 A1* | 9/2018 | Yang | .................... | H04B 7/0617 |
| 2018/0278467 A1* | 9/2018 | John Wilson | ........ | H04W 72/046 |
| 2018/0287682 A1* | 10/2018 | Kwak | .................... | H04L 5/0057 |
| 2018/0323848 A1* | 11/2018 | Mizusawa | .............. | H04W 16/28 |
| 2019/0150011 A1* | 5/2019 | Shoji | ...................... | H04W 16/28 |
| | | | | 370/329 |
| 2019/0181925 A1* | 6/2019 | Kang | .................... | H04B 7/0417 |
| 2019/0181934 A1* | 6/2019 | Kang | .................... | H04B 7/0404 |
| 2019/0199553 A1* | 6/2019 | Park | ...................... | H04W 72/06 |
| 2019/0207731 A1* | 7/2019 | Park | .................... | H04W 72/042 |
| 2019/0260459 A1* | 8/2019 | Jeon | .................... | H04B 7/0617 |
| 2019/0356371 A1* | 11/2019 | Osawa | .................. | H04W 88/02 |
| 2019/0372734 A1* | 12/2019 | Choi | .................... | H04L 25/0224 |
| 2020/0014448 A1* | 1/2020 | Osawa | ................ | H04B 7/0641 |
| 2020/0099488 A1* | 3/2020 | Kim | .................... | H04B 7/0456 |
| 2020/0213050 A1* | 7/2020 | Chen | .................... | H04L 5/0048 |

FOREIGN PATENT DOCUMENTS

| | | |
|---|---|---|
| CN | 102291212 A | 12/2011 |
| CN | 103220068 A | 7/2013 |
| CN | 103580812 A | 2/2014 |
| CN | 104253639 A | 12/2014 |
| CN | 105634658 A | 6/2016 |
| CN | 106160934 A | 11/2016 |
| CN | 106160952 A | 11/2016 |
| CN | 104067533 B | 11/2017 |
| CN | 104303431 B | 5/2018 |
| CN | 105453693 B | 3/2019 |
| CN | 106170927 B | 12/2019 |
| CN | 105264802 B | 1/2020 |
| CN | 105900474 B | 1/2020 |
| WO | 2015131378 A1 | 9/2015 |
| WO | 2016115654 A1 | 7/2016 |

* cited by examiner

CHANNEL STATE INFORMATION TRANSMISSION METHOD, TERMINAL DEVICE, AND NETWORK DEVICE

CROSS-REFERENCE TO RELATED APPLICATIONS

This application is a continuation of International Application No. PCT/CN2018/080242, filed on Mar. 23, 2018, which claims priority to Chinese Patent Application No. 201710184871.7, filed on Mar. 24, 2017. The disclosures of the aforementioned applications are hereby incorporated by reference in their entireties.

TECHNICAL FIELD

This application relates to the communications field, and more particularly, to a channel state information transmission method, a terminal device, and a network device.

BACKGROUND

To improve system performance, data is usually sent by using a multiple input multiple output (MIMO) technology in existing communications systems. In this case, a transmit end needs to know accurate channel state information (CSI). The accurate CSI enables the transmit end to perform appropriate data processing on to-be-sent data, such as precoding, determining a modulation and coding scheme, thereby improving data transmission efficiency and the system performance.

The CSI usually includes a precoding matrix indicator (PMI), a channel quality indicator (CQI), and a rank indicator (RI). The PMI is used to indicate a precoding matrix, and the network device can select, based on the PMI, a precoding matrix used to precode data. The CQI indicates channel quality, and is used to provide reference for a network device to determine a modulation and coding scheme. The RI indicates a quantity of data layers that the network device can transmit to a terminal at the same time, and a larger RI indicates more data layers that can be transmitted at the same time. Selection of the PMI is often related to a channel matrix between the network device and the terminal, and a higher degree of matching between the precoding matrix represented by the PMI and the channel matrix indicates that multi-user interference can be better mitigated when the network device selects, based on the PMI, the precoding matrix for precoding data.

In downlink transmission, the network device may send a channel state information-reference signal (CSI-RS) for the terminal to measure downlink CSI. In general, the terminal device may feed back the measured downlink CSI to the network device, so that the network device obtains the downlink CSI. The terminal device needs to occupy time-frequency resources for uplink transmission to feed back the downlink CSI to the network device. As a requirement of a wireless communications system for CSI feedback precision increases, more uplink time-frequency resources are occupied to feed back the downlink CSI, resulting in increased feedback overheads. This is not conducive to system throughput improvement.

In a time division duplex (TDD) system, same frequency is used for downlink transmission and uplink transmission, and therefore, it is assumed that M antennas of the network device may serve as both transmit antennas and receive antennas, and reciprocity between a receive channel and a transmit channel of each antenna is calibrated. In addition, N antennas of the terminal device may serve as both transmit antennas and receive antennas, and reciprocity between a receive channel and a transmit channel of each antenna is also calibrated. That is, the network device can determine a downlink channel matrix based on an uplink channel matrix when reciprocity calibration is performed on both the network device and the terminal device. For example, if $H \in C^{M \times N}$ indicates an uplink channel matrix with a dimension M×N, a downlink channel matrix is $H^T \in C^{N \times M}$.

Therefore, in the TDD system, when channels are reciprocal, downlink CSI may be obtained by using a simpler method: The terminal device sends a sounding reference signal (SRS), and the network device obtains an uplink channel matrix based on a received signal and the SRS, and the network device can obtain a downlink channel matrix according to channel reciprocity. In this case, the network device obtains the downlink CSI, the terminal device does not need to feed back the PMI, and the terminal device only needs to feed back the CQI and/or RI. This greatly reduces overheads required to obtain the downlink CSI.

However, limited by relatively high costs of transmit channels of antennas, in many terminal devices, a quantity of transmit channels is less than a quantity of receive channels. For example, a terminal device has four antennas (an antenna 1 to an antenna 4), and a receive channel is configured in each antenna, but only two transmit channels are configured. As a result, the SRS may be sent through transmit channels in only two antennas at each moment. For example, the terminal device uses antennas 1 and 2 to send the SRS, and an uplink channel obtained by the network device is an uplink channel matrix from the two antennas of the terminal device to the network device. According to channel reciprocity, the network device can only obtain a downlink channel matrix from the M antennas of the network device to the antennas 1 and 2 of the terminal device, but cannot obtain a downlink channel matrix of antennas 3 and 4. That is, the network device obtains an incomplete downlink channel matrix.

In an existing manner, when the terminal device has different quantities of transmit antennas and receive antennas, complete CSI is still fed back in an original manner, in particular, the network device sends a CSI-RS, and the terminal device measures the CSI-RS, obtains downlink CSI, and reports the CSI (including a PMI, a CQI, and an RI) to the network device. However, in this CSI feedback manner, when the PMI is fed back in a high-precision feedback manner (for example, the PMI represents RI eigenvectors of a downlink channel matrix by a linear combination), a large quantity of uplink time-frequency resources are occupied, and overheads are high.

In another existing manner, the network device obtains the incomplete downlink channel matrix by using the uplink channel matrix, then determines a downlink precoding matrix based on the incomplete downlink channel matrix, applies the precoding matrix to a CSI-RS, and sends a beamformed CSI-RS during downlink transmission. The terminal measures the beamformed CSI-RS, determines a CQI and an RI, and then reports the CQI/RI to the network device. The network device determines subsequent processing on data based on the precoding matrix determined by the network device and the CQI/RI reported by the terminal. In this solution, the terminal device does not feed back the PMI, reducing feedback overheads for the channel state information. However, because the downlink CSI used by the network device does not match a complete downlink channel, the network device processes data based on the incomplete downlink CSI (inaccurate downlink CSI). This definitely causes a loss of a downlink data transmission rate, and affects the system performance.

Therefore, how to improve downlink CSI feedback accuracy while reducing downlink CSI feedback overheads when the quantities of transmit antennas and receive antennas of the terminal device do not match is an urgent problem to be solved.

SUMMARY

Embodiments of this application provide a channel state information transmission method, a terminal device, and a network device. This method improves accuracy of the channel state information and reduces feedback overheads for the channel state information.

According to a first aspect, a channel state information transmission method is provided, and the method includes:

sending, by a terminal device, a first reference signal through a first antenna port set, where the first antenna port set includes n antenna ports, and n is a positive integer;

receiving, by the terminal device, a second reference signal through a second antenna port set, where the second antenna port set includes N antenna ports, N is a positive integer, n<N, and the first antenna port set is a proper subset of the second antenna port set; and sending, by the terminal device, channel state information, where content of the channel state information is associated with a rank indicator RI, and the channel state information and the RI are determined based on the second reference signal.

Therefore, in this embodiment of this application, the terminal device may determine the CSI content based on a value of the RI, and feedback overheads for the channel state information can compromise with feedback precision of the channel state information, to more flexibly determine the content of the channel state channel. Therefore, in this embodiment of this application, accuracy of the channel state information can be improved while the feedback overheads for the channel state information are reduced, thereby improving system performance.

It may be understood that the first reference signal may be, for example, a sounding reference signal (SRS), and the first reference signal may be another type of reference signal. An example in which the first reference signal is the SRS is used for description in this specification, but this is not limited in this embodiment of this application.

The network device may obtain an uplink channel matrix $H_1^T \in C^{M \times n}$ from the n antenna ports to M antenna ports of the network device through measurement of the SRS.

It should be understood that, in this embodiment of this application, a quantity of transmit channels of the terminal device may be n, or may be z, where n is a positive integer multiple of z: n/z=y, and y is a positive integer greater than 1.

When there are n transmit channels of the terminal device, the terminal device may send the first reference signal through the first antenna set once. When there are z transmit channels of the terminal device, the terminal device may send the first reference signal y times, and send the first reference signal through z antenna ports in the N antenna ports each time, and z antenna ports used to send the first reference signal this time are different from antenna ports used to previously send the first reference signal.

In other words, when there are z transmit channels of the terminal device, the first antenna port set may include y antenna port subsets each including a same quantity of ports, each antenna port subset includes z antenna ports, and antenna ports in two antenna port subsets are different from each other.

Correspondingly, in an embodiment, the sending, by a terminal device, a first reference signal through a first antenna port set includes: the terminal device sends the first reference signal to the network device through the y antenna port subsets y times, and sends the first reference signal through one antenna port subset each time.

In one embodiment, the terminal device may send the SRS a plurality of times, and sends the SRS for z antenna ports each time. For example, the terminal device may send the SRS y times (y is a positive integer, for example, a value of y is 1, 2, 3, 4 . . . ), for example, first send the SRS through antenna ports 1 to z, . . . , and send the SRS through the antenna ports (y−1)(z+1) to yz the $y^{th}$ time.

Because a quantity of transmit antenna ports of the terminal device is less than a quantity of receive antenna ports, the terminal device may send the first reference signal a plurality of times, and send the first reference signal through a different port each time. In this way, the network device may determine an uplink channel matrix by detecting the first reference signal for a plurality of times, and may further determine a corresponding downlink channel matrix according to reciprocity. In this way, each time when the terminal device sends one more reference signal, the network device can determine, according to reciprocity, information about a downlink channel matrix corresponding to other z antenna ports. Therefore, the terminal device sends the first reference signal a plurality of times, so that information about a downlink channel matrix that is not learned of by the network device can be reduced. In this way, when the terminal device subsequently feeds back channel state information, the terminal device can feed back less channel state information, thereby reducing a data amount of channel state information, reducing resource overheads, and improving the system performance.

However, in the foregoing embodiment, the SRS of z antenna ports separately sent at a plurality of sending moments (for example, a plurality of subframes) introduce unsatisfactory factors, such as an additional delay and an insertion loss that is introduced when a transmit channel is switched between different ports, resulting in reduced accuracy of a downlink channel matrix obtained by the network device. Therefore, a quantity y of times for sending the SRS cannot be excessively large. In a scenario, y=1, and in one embodiment, the network device sends the SRS through the n antenna ports once.

It may be understood that the second reference signal may be, for example, a CSI-RS, and the second reference signal may be another type of reference signal. An example in which the second reference signal is a CSI-RS is used for description in this specification, but this is not limited in this embodiment of this application.

It may be understood that the network device may send a non-beamformed (non-precoded/non-beamformed) CSI-RS for M antenna ports. Alternatively, the network device may send a beamformed (precoded/beamformed) CSI-RS. This is not limited in this embodiment of this application. The non-beamformed CSI-RS means that the CSI-RS is not precoded by the network device, and the terminal device may measure a downlink channel matrix from the M antenna ports of the network device to the N antenna ports in the second antenna port set of the terminal device based on the non-beamformed CSI-RS. The beamformed CSI-RS means that the network device precodes a CSI-RS of each antenna port by using a precoding matrix, and the terminal device measures an equivalent downlink channel matrix from the M antenna ports of the network device to the N antenna ports in the second antenna port set of the terminal device based on the beamformed CSI-RS. The equivalent downlink channel matrix is a result of applying M precoding matrices on a downlink channel matrix from $M_1$ antennas or transmitting and receiving units (transmitting and receiving unit, TxRU) of the network device to the N antenna ports of the terminal device.

It should be understood that the RI is used to indicate a quantity of data layers for downlink communication between the terminal device and the network device. In this embodiment of this application, the content of the channel state information may be flexibly determined based on the quantity of communication data layers.

It should be understood that in this embodiment of this application, CSI includes different parameters in different CSI content. Different CSI content may also be referred to as different CSI types, and each CSI type corresponds to one parameter set. For example, the CSI may include at least one of a CQI, the RI, and a PMI. The PMI may be a PMI indicating a channel eigenvector, a PMI indicating a channel vector, a PMI indicating a channel correlation matrix, an explicit feedback-based PMI, an implicit feedback-based PMI, and a codebook-based PMI that form a first set.

It may be understood that in this embodiment of this application, definition of the CSI is as follows: A first type of CSI content includes a CQI, an RI, and a first type of PMI (for example, the PMI indicating a channel eigenvector) in the PMIs, a second type of CSI content includes a CQI, an RI, and a second type of PMI (for example, the PMI indicating a channel correlation matrix) in the PMIs, a third type of CSI content includes a CQI and an RI, and a fourth type of CSI content includes only an RI.

It should be noted that if two pieces of CSI include same parameters, for example, both include a CQI/an RI, and a PMI, and the PMI is of a same type, the two pieces of CSI have same content. If two pieces of CSI include different parameters, or two pieces of CSI include different types of PMIs, the two pieces of CSI have different content.

It should be noted that for each type of PMI described above, if only values of an RI and/or a CQI reported together with the PMI are different, a plurality of pieces of corresponding CSI content are the same. For example, if a type of PMI reported by the terminal device is the PMI indicating a channel eigenvector, first CSI content includes a CQI, RI=1, and a PMI indicating a channel eigenvector and corresponding to the CQI/RI, and second CSI content includes a CQI, RI=3, and a PMI indicating a channel eigenvector and corresponding to the CQI/RI, the first CSI content is the same as the second CSI content.

In an embodiment, when RI≤X1, the content of the channel state information includes a channel quality indicator CQI and/or the RI, and the channel state information does not include a precoding matrix indicator PMI.

In this case, the terminal device needs to calculate the CQI based on a PMI hypothesis. Because the PMI is not fed back, the network device knows only a partial channel matrix $H_1$, the terminal device needs to assume, based on the channel matrix $H_1$, a PMI used by the network device. The terminal device may assume, according to a predefined rule, a rule indicated by the network device, or a rule assumed by the terminal device based on measurement, the PMI used by the network device in this case. In one embodiment, the terminal device first determines the RI through measurement of the CSI-RS, and assumes that with the RI, the network device uses RI primary eigenvectors of the matrix $H_1$ as a precoding matrix on a corresponding subband, and the terminal device may obtain a signal to interference plus noise ratio or another parameter of a received signal based on the PMI hypothesis, the RI, and a receiver (such as an MMSE receiver or an MMSE-IRC receiver) used by the terminal device, to obtain the CQI. In one embodiment, the terminal device may alternatively assume that the network device uses RI primary eigenvectors of a broadband channel correlation matrix of the matrix $H_1$ as a precoding matrix on each subband, and the terminal device may obtain a signal to interference plus noise ratio or another parameter of a received signal based on the PMI hypothesis, the RI, and a receiver used by the terminal device, to obtain the CQI. In one embodiment, the terminal device may also calculate the CQI by using another method. This is not limited herein.

When RI>X1, the content of the channel state information includes the CQI and/or the RI, and the channel state information further includes the PMI, where X1 is a positive integer less than or equal to N.

In an embodiment, when RI≤X1, the CQI is determined based on the RI and a channel matrix between k antenna ports and the n antenna ports, and the k antenna ports are antenna ports through which the network device sends the second reference signal; and when RI>X1, the CQI is determined based on the RI and the PMI.

In one embodiment, the terminal device first determines the RI through measurement of the CSI-RS. The terminal device determines the PMI based on the RI and an estimation result of a downlink channel matrix H, and the terminal device may obtain a signal to interference plus noise ratio or another parameter of a received signal based on the PMI, the RI, and a receiver of the terminal device (such as an MMSE receiver or an MMSE-IRC receiver), to obtain the CQI. In one embodiment, the CQI may also be calculated in another manner. This is not limited.

It should be understood that in this embodiment of this application, a value of X1 may be a system default value, a value determined by the terminal device, or a value indicated by the network device. This is not limited in this embodiment of this application.

For example, the value of X1 may be 1 or 2, and is not limited in this embodiment of this application.

In an embodiment, X1=1.

When X1=1, when RI≤1, the channel state information fed back by the terminal device does not include the PMI, and when RI>1, the channel state information fed back by the terminal device includes the PMI.

In one embodiment, when RI=1, there is only one data layer in downlink communication between the network device and the terminal device, and therefore, the terminal device does not feed back an accurate PMI, so that the network device transmits data by using the PMI obtained based on the partial channel matrix $H_1$. A caused performance loss is acceptable, and has little impact on overall network performance (in general, total network throughput is mainly determined by performance of a terminal device that simultaneously transmits a plurality of data streams in downlink communication, that is, RI>1). In addition, a channel eigenvector obtained by the network device based on the partial channel matrix $H_1$ is slightly different from a channel eigenvector obtained by the network device based on a full channel matrix H. Therefore, the eigenvector obtained based on the partial channel matrix is used to determine a precoding matrix used for data, a relatively small performance loss is caused, and relatively small multi-user interference is also caused to another terminal device.

Therefore, the terminal device may not feed back the PMI, and this can greatly reduce the resource overheads for the channel state information and improve the system performance.

When RI>1, the channel state information fed back by the terminal device includes the PMI. In this way, the terminal device feeds back the PMI, so that the network device can obtain complete channel state information, and can further process data based on the accurate channel state information, thereby improving data transmission efficiency and the system performance.

Similarly, when X1=2, 3, . . . , for example, when X1=2, when RI≤2, the channel state information fed back by the terminal device does not include the PMI, and when RI>2, the channel state information fed back by the terminal device includes the PMI.

In one embodiment, when RI≤X1, for example, RI≤2, it may be considered that a value of the RI is relatively small, that is, there are a relatively small quantity of data layers between the network device and the terminal device. Therefore, the terminal device may not feed back the PMI obtained based on the full channel matrix H, and the network device may obtain a precoding matrix based on the obtained partial channel matrix $H_1$. It may be considered that relatively small interference is caused between relatively small RI layers of data, and a downlink data transmission rate loss is relatively small. Therefore, the terminal device may not feed back the PMI when RI≤X1, and this can greatly reduce the resource overheads for the channel state information and improve the system performance.

When RI>X1, the CSI content reported by the terminal device includes the PMI. For terminal devices with RI>X1, an increase in downlink data transmission performance of the terminal devices is more critical to an increase in a total network throughput. Therefore, PMIs reported by these terminal devices based on the full channel matrix H match the matrix H more closely, interference between RI layers of data streams and interference between a plurality of terminal devices are greatly reduced, and this facilitates an increase in the system performance.

In an embodiment, when RI≤X2, the content of the channel state information includes a CQI and/or the RI, and the channel state information further includes a first PMI.

In an embodiment, when RI≤X2, the CQI is determined based on the RI and the first PMI.

When RI>X2, the content of the channel state information includes a CQI and/or the RI, and the channel state information further includes a second PMI.

In an embodiment, when RI>X2, the CQI is determined based on the RI, the second PMI, a channel matrix between the k antenna ports and the n antenna ports, and the k antenna ports are antenna ports through which the network device sends the second reference signal.

The first PMI and the second PMI are different elements in a first set, each element in the first set represents a different PMI type, the first set includes at least two PMI types in a PMI indicating a channel eigenvector, a PMI indicating a channel vector, a PMI indicating a channel correlation matrix, a codebook-based PMI, an explicit feedback-based PMI, and an implicit feedback-based PMI, and X2 is a positive integer less than or equal to N.

In other words, the first PMI and the second PMI are of different types. For example, the first PMI is the codebook-based PMI, and the second PMI is the PMI indicating a channel eigenvector; the first PMI is the implicit feedback-based PMI, and the second PMI is the explicit feedback-based PMI (for example, the PMI indicating a channel matrix, an eigenvector, or a correlation matrix); the first PMI is the high-precision PMI indicating an eigenvector, and the second PMI is the high-precision PMI indicating a channel correlation matrix.

Therefore, in this embodiment of this application, a type of the PMI in the channel state information may be flexibly determined based on a value relationship between a value of the RI and X2, to flexibly compromise between reducing feedback overheads for the channel state information and improving the system performance. For example, the first PMI is a low-precision PMI (such as the low-precision PMI indicating a channel eigenvector), and the second PMI is a high-precision PMI (such as the high-precision PMI indicating a channel eigenvector). When RI is less than X2, the first PMI is fed back, to reduce the feedback overheads for the channel state information. When RI is greater than X2, the first PMI is fed back, to improve the system performance.

In an embodiment, the method further includes:

sending, by the terminal device, second indication information, where the second indication information is used to indicate a PMI type of the first PMI or the second PMI; or the second indication information is used to indicate a value of N.

The network device may determine the reported PMI type based on the second indication information, to determine a downlink precoding matrix. For example, if the first PMI indicates RI eigenvectors of a downlink channel matrix from the M antenna ports of the network device to N or (n+X2) antenna ports, the network device learns of, based on the PMI, an eigenvector of a downlink channel matrix from the network device to the terminal device. In a single-user transmission mode, the RI eigenvectors may be used as the precoding matrix for data. During multi-user transmission, the network device may determine, based on information such as the RI eigenvectors and PMIs reported by other terminal devices, the precoding matrix used for data. If the first PMI indicates a channel vector of a downlink channel matrix from the M antenna ports of the network device to (N−n) non-transmit antenna ports of the terminal, the network device may obtain full information about a full channel matrix based on the PMI and the channel vector that is between the M antenna ports and the n transmit antenna ports and that is measured by the network device based on the SRS. In the single-user transmission mode, RI eigenvectors of the full channel matrix may be used as the precoding matrix for data. During multi-user transmission, the network device may determine, based on information such as the full channel matrix and PMIs reported by other terminal devices, the precoding matrix used for data.

Alternatively, the terminal device sends the second indication information, and the second indication information indicates a value of N. The network device may determine a value relationship between RI and (N−n) based on the value of N and the RI that is reported by the terminal device, so that the network device determines whether the type of PMI reported by the terminal device is the first PMI or the second PMI, to determine the downlink precoding matrix. A determining manner is described above, and details are not described again.

In other words, because the terminal device can flexibly determine the content of the channel state information based on different values of the RI, the terminal device can send the second indication information to indicate a type of the PMI in the fed back channel state information, so that the network device determines the type of the PMI based on the second indication information, to determine the precoding matrix.

In an embodiment, X2 is equal to P, P is a quantity of antenna ports included in a third antenna port set, the third antenna port set is a proper subset of the second antenna port set, the third antenna port set is different from the first antenna port set, 1≤P≤N−n, and P is an integer; and when 1<RI≤P, the channel state information includes the first PMI, where the first PMI is used to indicate RI eigenvectors of a downlink channel matrix from k antenna ports to the N antenna ports or (n+P) antenna ports, the k antenna ports are antenna ports through which the network device sends the second reference signal, and k is a positive integer.

In an embodiment, X2 is equal to P, P is a quantity of antenna ports included in a third antenna port set, the third antenna port set is a proper subset of the second antenna port set, the third antenna port set is different from the first antenna port set, 1≤P≤N−n, and P is an integer; and when RI>P, the channel state information includes the second PMI, the second PMI is used to indicate a channel correlation matrix of a downlink channel matrix from k antenna ports to the P antenna ports, and the k antenna ports are antenna ports through which the network device sends the second reference signal; or when RI>P, the channel state information includes the second PMI, the second PMI is used to indicate P channel vectors, each of the P vectors is a downlink channel vector from k antenna ports to one of the P antenna ports, and the k antenna ports are antenna ports through which the second reference signal is sent.

In an embodiment, when X2 is equal to P, and a value of P is indicated by the network device, the handover method may further include:

sending, by the network device, a first indication message, where the first indication message is used to indicate the third antenna port set.

For example, the first indication information indicates P antenna ports in the third antenna port set that are in the (N−n) antenna ports other than the n antenna ports in the N antenna ports.

In an embodiment, the first PMI includes base vector indication information and RI groups of linear combination coefficients, where the base vector indication information is used to indicate a group of base vectors, the group of base vectors includes at least two base vectors, and each group of linear combination coefficients is used to perform linear combination on the group of base vectors to represent one eigenvector.

In an embodiment, the second PMI includes base vector indication information and P groups of linear combination coefficients, where the base vector indication information is used to indicate a group of base vectors, the group of base vectors includes at least two base vectors, and each group of linear combination coefficients is used to perform linear combination on the group of base vectors to represent one eigenvector of the channel correlation matrix.

The second PMI includes base vector indication information and P groups of linear combination coefficients, where the base vector indication information is used to indicate a group of base vectors, the group of base vectors includes at least two base vectors, and each group of linear combination coefficients is used to perform linear combination on the group of base vectors to represent one channel vector.

In an embodiment, the method further includes:
sending, by the terminal device, fourth indication information, where the fourth indication information is used to indicate related information of P eigenvalues of the channel correlation matrix, and the P eigenvalues are associated with P eigenvectors of the channel correlation matrix.

In an embodiment, the first PMI indicates RI groups of linear combination coefficients, and each group of linear combination coefficients is used to represent one eigenvector.

In an embodiment, the second PMI indicates P groups of channel coefficients, and each group of channel coefficients is used to represent one eigenvector of the channel correlation matrix; or the second PMI indicates P groups of channel coefficients, and each group of channel coefficients is used to represent one channel vector.

It should be noted that P represents a quantity of ports in the third port set, and therefore, when X2=P, it may also be described that the content of the channel state channel in this embodiment of this application is associated with a value relationship between RI and P.

In one embodiment, when 1<RI≤P, the content of the channel state information includes the first PMI, where the first PMI is used to indicate RI eigenvectors of a downlink channel matrix from k antenna ports to the N antenna ports or (n+P) antenna ports, the k antenna ports are antenna ports through which the second reference signal is sent, and k is a positive integer.

The k antenna ports may be the M antenna ports of the network device or k antenna ports selected by the terminal device from the M antenna ports, for example, selected based on receive power or receive quality of a CSI-RS of each antenna port.

In one embodiment, P may be an integer less than (N−n). When the N antenna ports of the terminal device are sheltered/blocked due to holding the terminal device by a hand or other factors, the RI eigenvectors of a downlink channel from the k antenna ports to all the N antenna ports of the terminal is fed back, and this may cause performance degradation. This is because receive power of a received signal of blocked antenna ports is very low, channel estimation results corresponding to the blocked antenna ports are very inaccurate, and the RI eigenvectors are also inaccurate in this case. In contrast, measurement of only RI eigenvectors of a downlink channel from the k antenna ports to (n+P) antenna ports of the terminal is more accurate, and the P antenna ports are unblocked ports in the (N−n) non-transmit antenna ports. Similarly, the terminal device may have a plurality of antenna port groups (for example, each antenna port group includes a plurality of antenna ports on one antenna panel) and send the SRS through only n antenna ports in one antenna port group. In this case, the network device further expects to know channel state information corresponding to P antenna ports in another antenna port group. In this case, the terminal device only needs to feed back eigenvectors of channels corresponding to (n+P) antenna ports, and does not need to feed back eigenvectors of channels corresponding to all receiving antenna ports. In one embodiment, P may be equal to (N−n). In this case, the terminal device feeds back the RI eigenvectors that are of the downlink channel matrix from the k antenna ports to the N antenna ports and that are indicated by the first PMI.

Therefore, based on the first PMI, the network device may obtain the full channel matrix H or an eigenvector of a partial matrix that is in the matrix H and that the network device is interested in, to determine the precoding matrix used for data.

When RI>P, the content of the channel state information includes the second PMI, and the second PMI is used to indicate a correlation matrix of the downlink channel matrix from the k antenna ports to the P antenna ports. As described above, a manner of feeding back a correlation matrix may be to feed back P eigenvectors of the matrix. In this case, the terminal device further needs to report related information of P non-zero eigenvalues, and the P non-zero eigenvalues are associated with the P reported eigenvectors. In one embodiment, the P eigenvalues may be directly quantized and reported as the related information of the eigenvalues. In one embodiment, the eigenvalues may first be divided by a numeric Y, to obtain the related information of the eigenvalues. The numeric Y is selected properly, and a benefit of dividing by the numeric Y is to reduce a quantized interval and a quantity of bits required for quantization. In one embodiment, the numeric Y may be predefined or notified by the network device. In one embodiment, the numeric Y may be a maximum non-zero eigenvalue of a correlation matrix of the partial channel matrix $H_1$. Because the network device already obtains the maximum non-zero eigenvalue of $H_1$ through measurement of the SRS, the network device can recover the eigenvalue based on the related information of the eigenvalue reported by the terminal device. The network device can recover the correlation matrix of the downlink channel matrix from the k antenna ports to the P antenna ports based on the P eigenvectors and the P eigenvalues. In addition, the network device already obtains the correlation matrix of the partial channel matrix $H_1$ through measurement of the SRS. Therefore, the network device can obtain the correlation matrix of the full channel matrix H, to further determine the precoding matrix used for data.

In one embodiment, when RI>P, the second PMI may be of another type. For example, when RI>P, the content of the channel state information includes the second PMI, and the second PMI is used to indicate P channel vectors of the downlink channel matrix from the k antenna ports to the P antenna ports. Each channel vector is a channel vector between the first of the P antenna ports and the k antenna ports, and is a vector with a length k. Based on the P channel vectors reported by the terminal device and the partial channel matrix $H_1$ obtained by the network device through measurement of the SRS, the network device may obtain the correlation matrix of the downlink channel full matrix H, to further determine the precoding matrix used for data.

The advantage of determining, by the terminal device by comparing the value relationship between RI and P, whether to report the first PMI or the second PMI is that the network device can obtain the information about the full channel matrix H with lowest feedback overheads. It is assumed that the terminal device feeds back, with same precision, the eigenvectors indicated by the first PMI and the P channel vectors indicated by the second PMI. For example, two types of PMIs are fed back by using the previously PMI1+PMI2 method, the PMI 1 is broadband feedback, and the PMI 2 is a sub-band feedback. A PMI 1 indicates a group of base vectors, and L is the same in feedback of the two PMI types. A PMI 2 includes a plurality of groups of linear combination coefficients, each group of linear combination coefficients includes L non-zero coefficients, and a quantity of quantized bits of each coefficient is the same in feedback of the two PMI types. The PMI 1 brings same feedback overheads regardless of whether the first PMI or the second PMI is fed back. When the first PMI is fed back, the PMI 2 includes RI groups of linear combination coefficients, and when the second PMI is fed back, the PMI 2 includes P groups of linear combination coefficients. Therefore, when 1<RI≤P, PMI 2 reporting overheads caused by reporting the first PMI is less than PMI 2 reporting overheads caused by reporting the second PMI; and when RI>P, the PMI 2 reporting overheads caused by reporting the second PMI is less than the PMI 2 reporting overheads caused by reporting the first PMI. In another example, it is assumed that the terminal device feeds back, with the same precision, the eigenvectors indicated by the first PMI and the correlation matrix indicated by the second PMI. As described above, the correlation matrix may be reported by reporting a non-zero eigenvalue of the correlation matrix and an eigenvector corresponding to the non-zero eigenvalue. Because the correlation matrix of the downlink channel matrix from the k antenna ports to the P antenna ports has a maximum of P non-zero eigenvalues, the second PMI needs to indicate a maximum of P eigenvectors. Therefore, when 1<RI≤P, PMI 2 reporting overheads caused by reporting the first PMI is less than PMI 2 reporting overheads caused by reporting the second PMI; and when RI>P, the PMI 2 reporting overheads caused by reporting the second PMI is less than the PMI 2 reporting overheads caused by reporting the first PMI.

Therefore, the advantage of determining, by comparing the value relationship between RI and P, whether to report the first PMI or the second PMI is that the network device can obtain the information about the full channel matrix H with lowest feedback overheads.

Therefore, in this embodiment of this application, the terminal device determines the content of the fed back channel state channel based on a value relationship between RI and P, and can determine whether the PMI in the fed back channel state information is an eigenvector or a channel correlation matrix. Therefore, the channel state information may be reported by using lowest overheads, so that the network device obtains the complete CSI, and the system performance can be improved.

According to a second aspect, a channel state information transmission method is provided, and the method includes:

receiving, by a network device, a first reference signal, where the first reference signal is sent by a terminal device through a first antenna port set, the first antenna port set includes n antenna ports, and n is a positive integer;

sending, by the network device, a second reference signal through k antenna ports, where k is a positive integer; and receiving, by the network device, channel state information, where content of the channel state information is associated with a rank indicator RI.

In this embodiment of this application, the content of the channel state information received by the network device is associated with the rank indicator RI. The channel state information may be flexibly determined by the terminal device based on a value of the RI when a data amount of the channel state information compromises with feedback precision of the channel state information. Therefore, in this embodiment of this application, accuracy of the channel state information can be improved while feedback overheads for the channel state information are reduced, so that the network device can perform precoding based on the channel state information, thereby improving system performance.

It should be understood that the second aspect corresponds to the first aspect, an execution body in the second aspect is the network device, and an execution body in the first aspect may be the terminal device. For corresponding features and corresponding beneficial effects of the method on the network device side, refer to the corresponding descriptions on the terminal device side in the first aspect. Therefore, for brevity, detailed descriptions are omitted appropriately.

In an embodiment, when RI≤X1, the content of the channel state information includes a channel quality indicator CQI and/or the RI, and the channel state information does not include a precoding matrix indicator PMI.

When RI>X1, the content of the channel state information includes the CQI and/or the RI, and the channel state information further includes the PMI, where X1 is a positive integer less than or equal to N, N represents a quantity of antenna ports in the second antenna port set through which the terminal device receives the second reference signal, N is a positive integer, n<N, and the first antenna port set is a proper subset of the second antenna port set.

In an embodiment, when RI≤X1, the CQI is determined based on the RI and a channel matrix between the k antenna ports and the n antenna ports; and when RI>X1, the CQI is determined based on the RI and the PMI.

In an embodiment, X1=1.

In an embodiment, when RI≤X2, the content of the channel state information includes a CQI and/or the RI, and the channel state information further includes a first PMI.

When RI>X2, the content of the channel state information includes a CQI and/or the RI, and the channel state information further includes a second PMI.

the first PMI and the second PMI are different elements in a first set, each element in the first set represents a different PMI type, and the first set includes at least two PMI types in a PMI indicating a channel eigenvector, a PMI indicating a channel vector, a PMI indicating a channel correlation matrix, a codebook-based PMI, an explicit feedback-based PMI, and an implicit feedback-based PMI; and X2 is a positive integer less than or equal to N, N represents a quantity of antenna ports in the second antenna port set through which the terminal device receives the second reference signal, N is a positive integer, n<N, and the first antenna port set is a proper subset of the second antenna port set.

In an embodiment, X2 is equal to P, P is a quantity of antenna ports included in a third antenna port set, the third antenna port set is a proper subset of the second antenna port set, the third antenna port set is different from the first antenna port set, 1≤P≤N−n, and P is an integer; and when 1<RI≤P, the channel state information includes the first PMI, where the first PMI is used to indicate RI eigenvectors of a downlink channel matrix from k antenna ports to the N antenna ports or (n+P) antenna ports.

In an embodiment, when RI≤X2, the CQI is determined based on the RI and the first PMI.

In an embodiment, X2 is equal to P, P is a quantity of antenna ports included in a third antenna port set, the third antenna port set is a proper subset of the second antenna port set, the third antenna port set is different from the first antenna port set, 1≤P≤N−n, and P is an integer; and when RI>P, the channel state information includes the second PMI, where the second PMI is used to indicate a channel correlation matrix of a downlink channel matrix from k antenna ports to the P antenna ports; or when RI>P, the channel state information includes the second PMI, the second PMI is used to indicate P channel vectors, each of the P vectors is a downlink channel vector from the k antenna ports to one of the P antenna ports.

In an embodiment, when RI>X2, the CQI is determined based on the RI, the second PMI, and a channel matrix between the k antenna ports and the n antenna ports.

In an embodiment, the first PMI includes base vector indication information and RI groups of linear combination coefficients, where the base vector indication information is used to indicate a group of base vectors, the group of base vectors includes at least two base vectors, and each group of linear combination coefficients is used to perform linear combination on the group of base vectors to represent one eigenvector.

In an embodiment, the second PMI includes base vector indication information and P groups of linear combination coefficients, where the base vector indication information is used to indicate a group of base vectors, the group of base vectors includes at least two base vectors, and each group of linear combination coefficients is used to perform linear combination on the group of base vectors to represent one eigenvector of the channel correlation matrix.

The second PMI includes base vector indication information and P groups of linear combination coefficients, where the base vector indication information is used to indicate a group of base vectors, the group of base vectors includes at least two base vectors, and each group of linear combination coefficients is used to perform linear combination on the group of base vectors to represent one channel vector.

In an embodiment, the method further includes:

receiving, by the network device, fourth indication information, where the fourth indication information is used to indicate related information of P eigenvalues of the channel correlation matrix, and the P eigenvalues are associated with P eigenvectors of the channel correlation matrix.

In an embodiment, the first PMI indicates RI groups of linear combination coefficients, and each group of linear combination coefficients is used to represent one eigenvector.

In an embodiment, the second PMI indicates P groups of channel coefficients, and each group of channel coefficients is used to represent one eigenvector of the channel correlation matrix; or the second PMI indicates P groups of channel coefficients, and each group of channel coefficients is used to represent one channel vector.

In an embodiment, the method further includes:

sending, by the network device, a first indication message, where the first indication message is used to indicate the third antenna port set.

In an embodiment, the third antenna port set is a complement set of the first port set, and a union of the third antenna port set and the first port set is the second port set.

In an embodiment, the method further includes:

receiving, by the network device, second indication information, where the second indication information is used to indicate a PMI type of the first PMI or the second PMI; or the second indication information is used to indicate a value of N.

In an embodiment, the method further includes:

receiving, by the network device, third indication information, where the third indication information is used to indicate the k antenna ports.

In an embodiment, the first reference signal is a sounding reference signal SRS.

In an embodiment, the second reference signal is a channel state information-reference signal CSI-RS.

In this embodiment of this application, the content of the channel state information received by the network device is associated with the RI. The channel state information may be flexibly determined by the terminal device based on a value of the RI when a data amount of the channel state information compromises with feedback precision of the channel state information. Therefore, in this embodiment of this application, accuracy of the channel state information can be improved while feedback overheads for the channel state information are reduced, so that the network device can perform precoding based on the channel state information, thereby improving system performance.

According to a third aspect, a terminal device is provided and configured to perform the method in the first aspect or any embodiment. In one embodiment, the terminal device includes units configured to perform the foregoing method.

According to a fourth aspect, a network device is provided and configured to perform the method in the second aspect or any embodiment. In one embodiment, the network device includes units configured to perform the foregoing method.

According to a fifth aspect, a terminal device is provided. The terminal device includes a processor and a memory. The memory is configured to store a computer program. The processor is configured to perform the computer program stored in the memory, and perform the method in the first aspect or any embodiment.

According to a sixth aspect, a network device is provided. The network device includes a processor and a memory. The memory is configured to store a computer program. The processor is configured to perform the computer program stored in the memory, and perform the method in the second aspect or any embodiment.

According to a seventh aspect, a computer readable medium is provided and is configured to store a computer program. The computer program includes an instruction used to perform the method in the first aspect or any embodiment.

According to an eighth aspect, a computer readable medium is provided and is configured to store a computer program. The computer program includes an instruction used to perform the method in the second aspect or any embodiment.

DESCRIPTION OF EMBODIMENTS

The following describes technical solutions of this application with reference to accompanying drawings.

The embodiments of this application may be applied to various communications systems. Therefore, the following descriptions are not limited to a particular communications system. For example, the embodiments of this application may be applied to a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS).

The terminal device in the embodiments of this application may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, or a terminal device in a future 5G network.

In the embodiments of this application, a network device may be a device, for example, a network side device, configured to communicate with a mobile device. The network-side device may be a base transceiver station (BTS) in the global system for mobile communications (GSM) or code division multiple access (CDMA), a NodeB (NB) in wideband code division multiple access (WCDMA), eNB or an evolved NodeB (eNodeB) in long term evolution (LTE), a relay station or an access point, an in-vehicle device, a wearable device, or a network-side device in the future 5G network.

Figure 1:
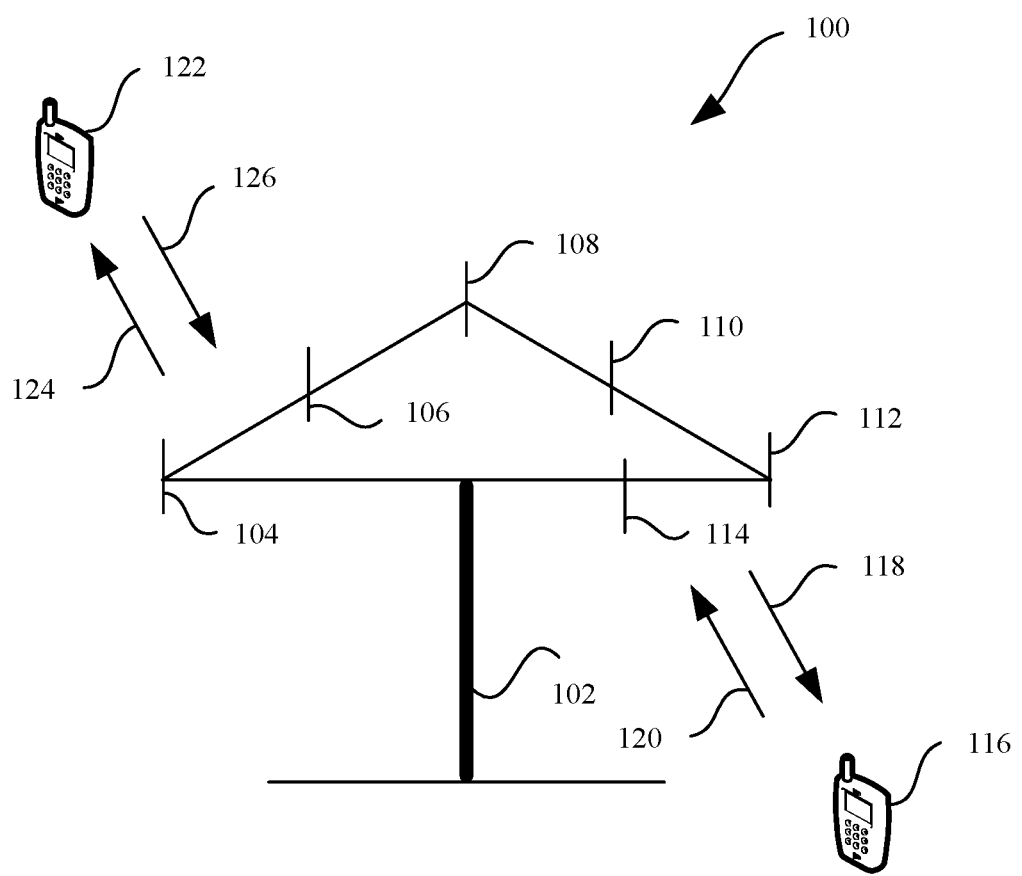
FIG. 1 is a scenario diagram of a communications system to which an embodiment of this application can be applied.

FIG. 1 is a schematic diagram of a communications system of a data transmission method according to this application. The communications system may be any one of the foregoing communications systems. As shown in FIG. 1, the communications system 100 includes a network side device 102, and the network side device 102 may include a plurality of antenna groups. Each antenna group may include a plurality of antennas. For example, one antenna group may include antennas 104 and 106, another antenna group may include antennas 108 and 110, and an additional group may include antennas 112 and 114. FIG. 1 shows two antennas for each antenna group, but each group may include more or fewer antennas. The network side device 102 may additionally include a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving.

The network side device 102 may communicate with a plurality of terminal devices (for example, a terminal device 116 and a terminal device 122). However, it may be understood that the network side device 102 may communicate with any quantity of terminal devices similar to the terminal device 116 or 122. The terminal devices 116 and 122 each may be, for example, a cellular phone, a smartphone, a portable computer, a handheld communications device, a handheld computing device, a satellite radio apparatus, a global positioning system, a PDA, and/or any other suitable device used for communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 may use a band different from that used by the reverse link 120, and the forward link 124 may use a band different from that used by the reverse link 126.

For another example, in a time division duplex system and a full duplex system, the forward link 118 and the reverse link 120 may use a same band, and the forward link 124 and the reverse link 126 may use a same band.

Each antenna group and/or region designed for communication is referred to as a sector of the network side device 102. For example, an antenna group may be designed to communicate with a terminal device in a sector in a coverage area of the network side device 102. In a process in which the network side device 102 communicates with the terminal devices 116 and 122 respectively through the forward links 118 and 124, beamforming may be used in transmit antennas of the network side device 102, to increase signal to noise ratios of the forward links 118 and 124. In addition, compared with a manner in which a network side device sends signals to all terminal devices of the network side device by using a single antenna, when the network side device 102 sends, through beamforming, signals to the terminal devices 116 and 122 randomly distributed in a related coverage area, a mobile device in a neighboring cell receives relatively low interference.

At a given time, the network side device 102, the terminal device 116, or the terminal device 122 may be a wireless communication sending apparatus and/or a wireless communication receiving apparatus. When sending data, the wireless communications sending apparatus may encode the data for transmission. In one embodiment, the wireless communications transmitting apparatus may obtain (for example, generate, receive from another communications apparatus, or store in a memory) a quantity of data bits that need to be transmitted to the wireless communications receiving apparatus by using a channel. The data bits may be included in a transport block (or a plurality of transport blocks) of data, and the transport block may be segmented to generate a plurality of code blocks.

To make the embodiments of this application easier to be understood, the following first describes some descriptions in the embodiments of this application. These descriptions should not be considered as a limitation on the protection scope claimed in this application.

A transmit end (for example, a network device) of a signal obtains information about a channel between the transmit end and a receive end (for example, a terminal device), and may precode a transmit signal based on the obtained channel information. In this way, energy of the network device for transmitting a signal can be concentrated in a direction in which the terminal device is located, so that the terminal device can obtain a relatively high signal-to-noise ratio for signal receiving. In addition, if the network device sends a plurality of layers of data streams to the terminal device, some or all interference between data streams may be eliminated in advance at the transmit end in this manner, thereby improving system performance.

A matrix used by the transmit end for precoding is a precoding matrix.

A relationship between a received signal y and a transmitted signal x that are obtained after the transmit end performs precoding can be shown in the following formula:

$y = HWx + n$, where x is a transmit signal, y is a receive signal, H is a channel matrix, W is a precoding matrix, and n represents noise.

The embodiments of this application mainly relate to a solution about how the terminal device sends channel state information to the network device, so that the network device determines a precoding matrix based on the channel information.

For ease of understanding and description, by way of example rather than limitation, an execution process and execution actions of a channel state information transmission method in the communications system in this application are described below.

Figure 2:
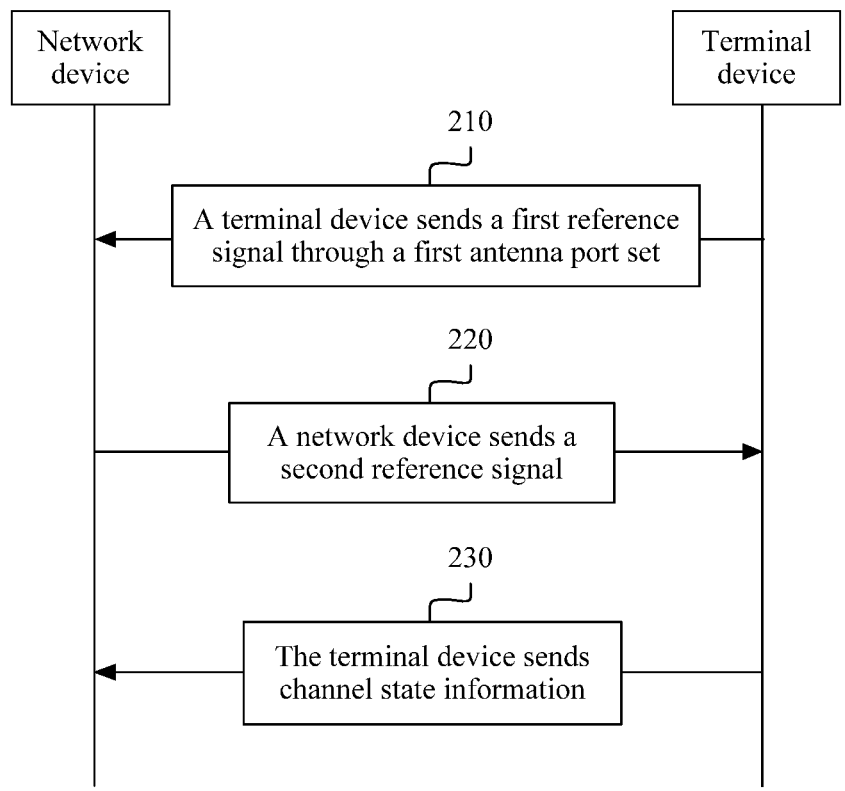
FIG. 2 is a schematic flowchart of a channel state information transmission method according to an embodiment of this application.

FIG. 2 is a schematic flowchart of a channel state information transmission method according to an embodiment of this application. The method shown in FIG. 2 may be applied to the foregoing system, for example, the method may be applied to a TDD system, an FDD system, or another system scenario. This is not limited in this embodiment of this application.

The following uses the TDD system as an example to describe the channel state information transmission method in this embodiment of this application, but this embodiment of this application is not limited thereto.

In one embodiment, the TDD system includes a terminal device and a network device, and the terminal device includes N antenna ports. A receive channel is configured for each of the N antenna ports and may be used to receive downlink data and a downlink reference signal, and the N antenna ports form a second antenna port set that may also be referred to as a receive antenna port set $Sr = \{1, 2, \ldots, N\}$. A quantity of transmit channels of the terminal device is less than a quantity N of receive channels, and only n of the N antenna ports may be used to send uplink data and an uplink reference signal, and form a first antenna port set that may also be referred to as a transmit antenna port set St, where n<N, and the first antenna port set is a proper subset of the second antenna port set. The network device includes M antenna ports, and the M antenna ports may be used to receive the uplink data and the uplink reference signal, or send the downlink data and the downlink reference signal.

In one embodiment, a method 200 shown in FIG. 2 includes the following operations.

210. The terminal device sends a first reference signal through the first antenna port set.

The first antenna port set includes n antenna ports, and n is a positive integer.

In one embodiment, the terminal device sends the first reference signal to the network device through the n antenna ports.

For example, the first reference signal may be, for example, a sounding reference signal (SRS), and the first reference signal may be another type of reference signal. The following uses an example in which the first reference signal is the SRS for description, but this is not limited in this embodiment of this application.

The network device may obtain an uplink channel matrix $H_1^T \in C^{M \times n}$ from the n antenna ports to the M antenna ports of the network device through measurement of the SRS.

It should be understood that, in this embodiment of this application, the quantity of transmit channels of the terminal device may be n, or may be z, where n is a positive integer multiple of z: n/z=y, and y is a positive integer greater than 1.

When there are n transmit channels of the terminal device, the terminal device may send the first reference signal through the first antenna set once. When there are z transmit channels of the terminal device, the terminal device may send the first reference signal y times, and send the first reference signal through z antenna ports in the N antenna ports each time, and z antenna ports used to send the first reference signal this time are different from antenna ports used to previously send the first reference signal.

In other words, when there are z transmit channels of the terminal device, the first antenna port set may include y antenna port subsets each including a same quantity of ports, each antenna port subset includes z antenna ports, and antenna ports in two antenna port subsets are different from each other.

Correspondingly, in another embodiment, in 210, the terminal device sends the first reference signal to the network device through the y antenna port subsets y times, and sends the first reference signal through one antenna port subset each time.

In one embodiment, the terminal device may send the SRS a plurality of times, and sends the SRS for z antenna ports each time. For example, the terminal device may send the SRS y times (y is a positive integer, for example, a value of y is 1, 2, 3, 4 . . . ), for example, first send the SRS through antenna ports 1 to z, . . . , and send the SRS through the antenna ports (y−1)(z+1) to yz the $y^{th}$ time.

Because a quantity of transmit antenna ports of the terminal device is less than a quantity of receive antenna ports, the terminal device may send the first reference signal a plurality of times, and send the first reference signal through a different port each time. In this way, the network device may determine an uplink channel matrix by detecting the first reference signal for a plurality of times, and may further determine a corresponding downlink channel matrix according to reciprocity. In this way, each time when the terminal device sends one more reference signal, the network device can determine, according to reciprocity, information about a downlink channel matrix corresponding to other z antenna ports. Therefore, the terminal device sends the first reference signal a plurality of times, so that information about a downlink channel matrix that is not learned of by the network device can be reduced. In this way, when the terminal device subsequently feeds back channel state information, the terminal device can feed back less channel state information, thereby reducing a data amount of channel state information, reducing resource overheads, and improving system performance.

However, in the foregoing embodiment, the SRS of z antenna ports separately sent at a plurality of sending moments (for example, a plurality of subframes) introduce unsatisfactory factors, such as an additional delay and an insertion loss that is introduced when a transmit channel is switched between different ports, resulting in reduced accuracy of a downlink channel matrix obtained by the network device. Therefore, a quantity y of times for sending the SRS cannot be excessively large. In a scenario, y=1 or 2, and in one embodiment, the network device sends the SRS through the n antenna ports once or twice, but this is not limited in this embodiment of this application.

220. The network device sends a second reference signal.

For example, the network device may send the second reference signal to the terminal device through the M antenna ports.

Correspondingly, the terminal device may receive the second reference signal through the second antenna port set.

In one embodiment, the first antenna port set is a proper subset of the second antenna port set, in other words, the quantity of transmit antenna ports of the terminal device is less than the quantity of receive antenna ports, that is, the transmit antenna ports do not match the receive antenna ports (the quantities are not equal). According to reciprocity, the network device can only obtain a partial downlink channel matrix $H_1$ based on the uplink channel matrix. Therefore, in order to obtain a complete downlink channel matrix, the network device needs to send the second reference signal to the terminal device.

It should be understood that the second reference signal may be, for example, a CSI-RS, and the second reference signal may be another type of reference signal. The following uses an example in which the second reference signal is a CSI-RS for description, but this is not limited in this embodiment of this application.

It should be understood that the network device may send a non-beamformed (non-precoded/non-beamformed) CSI-RS for M antenna ports. Alternatively, the network device may send a beamformed (precoded/beamformed) CSI-RS. This is not limited in this embodiment of this application. The non-beamformed CSI-RS means that the CSI-RS is not precoded by the network device, and the terminal device may measure a downlink channel matrix from the M antenna ports of the network device to the N antenna ports in the second antenna port set of the terminal device based on the non-beamformed CSI-RS. The beamformed CSI-RS means that the network device precodes a CSI-RS of each antenna port by using a precoding matrix, and the terminal device measures an equivalent downlink channel matrix from the M antenna ports of the network device to the N antenna ports in the second antenna port set of the terminal device based on the beamformed CSI-RS. The equivalent downlink channel matrix is a result of applying M precoding matrices on a downlink channel matrix from $M_1$ antennas or transmitting and receiving units (transmitting and receiving unit, TxRU) of the network device to the N antenna ports of the terminal device.

230. The terminal device sends channel state information, where content of the channel state information is associated with a rank indicator RI, and the channel state information and the RI are determined based on the second reference signal.

In one embodiment, the terminal device may measure the CSI-RS, determine a value of the RI, and determine, based on the value of the RI, the content of the channel state information to be sent to the network device.

It should be understood that the RI is used to indicate a quantity of data layers for downlink communication between the terminal device and the network device. In this embodiment of this application, the content of the channel state information may be flexibly determined based on the quantity of communication data layers.

It should be understood that in this embodiment of this application, CSI includes different parameters in different CSI content. Different CSI content may also be referred to as different CSI types, and each CSI type corresponds to one parameter set. For example, the CSI may include at least one of a CQI, the RI, and a PMI. The PMI may be a PMI indicating a channel eigenvector, a PMI indicating a channel vector, a PMI indicating a channel correlation matrix, an explicit feedback-based PMI, an implicit feedback-based PMI, and a codebook-based PMI that form a first set.

The PMI indicating a channel eigenvector is used to indicate a channel eigenvector of the downlink channel matrix from the M antenna ports of the network device to the N antenna ports of the terminal device. Further, the PMI may have different feedback precision, and may further be classified into a high-precision PMI indicating a channel eigenvector and a low-precision PMI indicating a channel eigenvector. High precision indicates a more accurate channel eigenvector, but higher overheads are brought for feedback.

Low accuracy indicates a less accurate channel eigenvector, but lower overheads are brought for feedback.

The PMI indicating a channel vector is used to indicate one or more channel vectors, each channel vector is a downlink channel vector from the M antenna ports of the network device to one of the N antenna ports of the terminal device, and each channel vector has a length M. For example, a downlink channel vector corresponding to the $i(i \in \{1, \ldots, N\})^{th}$ port of the terminal device may be represented as $h_i = [h_{i,1}, h_{i,2}, \ldots h_{i,M}]$, where $h_{i,j}$ represents a coefficient of a downlink channel from the $j(j \in \{1, \ldots, N\})^{th}$ port of the network device to the $i^{th}$ port of the terminal device, and these M coefficients form the channel vector corresponding to the $i^{th}$ port. Further, the PMI may have different feedback precision, and may further be classified into a high-precision PMI indicating a channel vector and a low-precision PMI indicating a channel vector. High precision indicates a more accurate channel vector, but higher overheads are brought for feedback. Low accuracy indicates a less accurate channel vector, but lower overheads are brought for feedback.

The PMI indicating a channel correlation matrix is used to indicate a channel correlation matrix of the downlink channel matrix from the M antenna ports of the network device to the N antenna ports of the terminal device. Further, the PMI may have different feedback precision, and may further be classified into a high-precision PMI indicating a channel correlation matrix and a low-precision PMI indicating a channel correlation matrix. High precision indicates a more accurate channel vector, but higher overheads are brought for feedback. Low accuracy indicates a less accurate channel vector, but lower overheads are brought for feedback.

The codebook-based PMI indicates that the PMI is selected from predefined codebooks, and the PMI may represent a channel eigenvector, a channel matrix, or a channel correlation matrix. Therefore, codebook-based PMIs are a type of PMIs. In one embodiment, the PMI is used to represent a channel eigenvector, a channel matrix, or a channel correlation matrix with high precision or low precision, and indicated content and/or indication precision may be configured by the network device by sending signaling or may be predefined.

The explicit feedback-based PMI indicates that the PMI directly represents a channel eigenvector, a channel vector, or a channel correlation matrix without considering a receiver of the terminal device. Therefore, explicit feedback-based PMIs are a type of PMIs. In one embodiment, the PMI is used to represent a channel eigenvector, a channel matrix, or a channel correlation matrix with high precision or low precision, and indicated content and/or indication precision may be configured by the network device by sending signaling or may be predefined.

The implicitly feedback-based PMI indicates that the PMI considers a receiver of the terminal device, is a PMI on which both the receiver of the terminal device and a channel eigenvector (or a channel vector or a channel correlation matrix) operate, and does not directly represent a channel eigenvector (or a channel vector or a channel correlation matrix). Therefore, explicit feedback-based PMIs are a type of PMIs. In one embodiment, the PMI is used to represent a channel eigenvector, a channel matrix, or a channel correlation matrix with high precision or low precision, and indicated content and/or indication precision may be configured by the network device by sending signaling or may be predefined.

Details are described below by using examples.

Entire bandwidth in which the network device communicates with the terminal device is divided into S subbands, and a matrix $H_s \in C^{N \times M}$ represents a downlink channel matrix from the network device to the terminal device on a subband s (s=1, ..., S). $u_1, \ldots, u_x$ represent x eigenvectors of a matrix $H_s^H H_s$ on the sub-band, and x is a positive integer.

The PMI indicating a channel eigenvector represents a PMI indicating the x eigenvectors, and a value of x may be recommended by the terminal device to the network device or configured by the network device.

When the PMI is a high-precision PMI, the following form may be used.

When the CSI-RS sent by the network device is a non-precoded CSI-RS or is similar to a class B precoded CSI-RS with K>1 in an LTE system, the PMI includes a PMI 1 and a PMI 2. The PMI 1 indicates a group of base vectors $\{b_1, \ldots, b_L\}$ (when the network device uses a single-polarized antenna, $b_i \in C^{M \times 1}$; and when the network device uses a dual-polarized antenna, $b_i \in C^{(M/2) \times 1}$), where L is a positive integer greater than 1. The PMI 2 includes x groups of linear combination coefficients, and each group of linear combination coefficients includes at least two non-zero coefficients. Each group of linear combination coefficients is used to perform linear combination on the group of base vectors indicated by the PMI 1, and a result of the linear combination is used to represent one eigenvector. For example, x=1, and in one embodiment, the PMI indicates an eigenvector $u_1$, and when the network device uses a dual-polarized antenna, the group of base vectors indicated by the PMI 1 forms a matrix $W_1$:

$$W_1 = \begin{bmatrix} b_1 & \ldots & b_L & & & \\ & & & b_1 & \ldots & b_L \end{bmatrix}.$$

The PMI 2 includes a group of linear combination coefficients $[a_1, \ldots, a_{2L}]$, and $$\begin{bmatrix} \sum_{i=1}^{L} a_i b_i \\ \sum_{i=L+1}^{2L} a_i b_{i-L} \end{bmatrix}$$

is used to represent the eigenvector $u_1$. In one embodiment, the PMI 1 may indicate one group of base vectors for each polarization direction, and two groups of base vectors: $\{b_1, \ldots, b_L\}$ and $\{b_1', \ldots, b_L'\}$ are different. In this case, the two groups of base vectors indicated by the PMI 1 form a matrix $W_1$:

$$W_1 = \begin{bmatrix} b_1 & \ldots & b_L & & & \\ & & & b_1' & \ldots & b_L' \end{bmatrix}.$$

The PMI 2 includes a group of linear combination coefficients $[a_1, \ldots, a_{2L}]$, and $\begin{bmatrix} \sum_{i=1}^{L} a_i b_i \\ \sum_{i=L+1}^{2L} a_i b'_{i-L} \end{bmatrix}$ is used to represent the eigenvector $u_1$. More base vectors in the group of base vectors indicated by PMI 1, that is, a larger L, and more precise quantization of the x groups of linear combination coefficients included by the PMI 2 indicate that a result of the linear combination based on the PMI 1 and the PMI 2 of the PMI can represent an eigenvector more accurately. The PMI 1 is reported for the entire bandwidth, that is, broadband reporting; the PMI 2 is reported for each subband, that is, subband reporting.

When the CSI-RS sent by the network device is similar to a class B precoded CSI-RS with K=1 in an LTE system, the PMI includes a PMI 2. The PMI 2 includes x groups of linear combination coefficients, and each group of linear combination coefficients includes at least two non-zero coefficients. Each group of linear combination coefficients represents one eigenvector of an equivalent downlink channel matrix from k antenna ports of the network device to the N antenna ports of the terminal device. The k antenna ports are in the M antenna ports and are selected by the terminal device based on measurement. Therefore, k is an integer less than or equal to M. In this case, in addition to the PMI, the terminal device further needs to feed back third indication information, and the third indication information is used to indicate numbers of the k antenna ports. For example, if precoding matrices corresponding to CSI-RSs of the k antenna ports are respectively $w_1, \ldots, w_k$, the equivalent downlink channel matrix is $H_s[w_1, \ldots, w_k]$, and eigenvectors are $v_1, \ldots, v_x$, where x is a positive integer. If x=1, the PMI 2 includes x=1 group of linear combination coefficients $[a_1, \ldots, a_k]$, and the group of coefficients approximately represents $v_1$. A larger quantity k of antenna ports selected by the terminal device and more precise quantification of the x groups of linear combination coefficients included in the PMI 2 indicate that a result obtained based on the PMI 2 can represent the eigenvector of the equivalent downlink channel more accurately. Selection of the k antenna ports is reported for the entire bandwidth, that is, broadband reporting; the PMI 2 is reported for each subband, that is, subband reporting. The high-precision PMI indicating a channel eigenvector also belongs to the explicit feedback-based PMI.

When the PMI indicating a channel eigenvector is a low-precision PMI, the following form may be used.

When the CSI-RS sent by the network device is a non-precoded CSI-RS or is similar to a class B precoded CSI-RS with K>1 in an LTE system, the PMI includes a PMI 1 and a PMI 2. The PMI 1 indicates a group of base vectors $\{b_1, \ldots, b_L\}$. For each eigenvector $u_i$ (i=1, \ldots, x), the PMI 2 is used to select a base vector from the group of base vectors when the network device uses a single-polarized antenna, and the PMI 2 is used to select a base vector from the group of base vectors and a phase difference between two polarization directions when the network device uses a dual-polarized antenna. For example, x=2, and in one embodiment, the PMI indicates eigenvectors $u_1$ and $u_2$, and when the network device uses a dual-polarized antenna, the group of base vectors indicated by the PMI 1 forms a matrix $W_1$:

$$W_1 = \begin{bmatrix} b_1 & \ldots & b_L & & & \\ & & & b_1 & \ldots & b_L \end{bmatrix}.$$

The PMI 2 indicates a matrix $W_2$, and $W_2$ has x=2 columns:

$$W_2 = \begin{bmatrix} e_i & e_j \\ \varphi e_i & -\varphi e_j \end{bmatrix}.$$

$e_i$ is a vector with a length L, the $i^{th}$ element is 1, and other elements are 0. $\varphi$ is the phase difference between the two polarization directions, and may be selected from a predefined set. For example, the set may be $$\left\{0, \frac{\pi}{2}, \pi, \frac{3\pi}{2}\right\},$$

or may include more values. This is not limited herein. $[u_1, u_2]$ is represented by $$W_1 W_2 == \begin{bmatrix} b_i & b_j \\ \varphi b_i & -\varphi b_j \end{bmatrix}$$

based on the PMI 1 and the PMI 2. The PMI 1 may also indicate two different groups of base vectors for antenna ports in the two polarization directions. This is similar to the above example, and details are not described again. When the PMI 1 and the PMI 2 are selected from predefined codebooks, the low-precision PMI indicating a channel eigenvector also belongs to the codebook-based PMI. When the terminal device selects the PMI 1 and the PMI 2 from the codebooks, if the receiver of the terminal device is considered, the low-precision PMI indicating a channel eigenvector also belongs to the implicit feedback-based PMI. The PMI 1 is reported for the entire bandwidth, that is, broadband reporting; the PMI 2 is reported for each subband, that is, subband reporting.

When the CSI-RS sent by the network device is similar to a class B precoded CSI-RS with K=1 in an LTE system, the PMI includes a PMI 2. The PMI 2 indicates a matrix $W_2$, $W_2$ has x=2 columns, and each column selects one antenna port for each channel eigenvector:

$$W_2 = \begin{bmatrix} e_i & e_j \\ \varphi e_i & -\varphi e_j \end{bmatrix}.$$

$e_i$ is a vector with a length of M/2, the $i^{th}$ element is 1, other elements are 0, and $e_i$ is used to select the $i^{th}$ antenna port from M/2 antenna ports. $\varphi$ is a phase difference between two polarization directions, and may be selected from a predefined set. For example, the set may be $$\left\{0, \frac{\pi}{2}, \pi, \frac{3\pi}{2}\right\},$$

or may include more values. This is not limited herein. $W_2$ approximately represents two eigenvectors of an equivalent downlink channel matrix. The PMI 2 is reported for each subband, that is, subband reporting.

Therefore, the low-precision PMI indicating a channel eigenvector may be the explicit feedback-based PMI, the implicit feedback-based PMI, or the codebook-based PMI.

Based on the PMI indicating a channel eigenvector, the network device can obtain an approximate representation of the eigenvector of the downlink channel matrix, to provide reference for determining a precoding matrix used for data.

The following further describes the PMI indicating a channel vector by using the foregoing example.

The PMI indicating a channel vector is a PMI used to indicate one or more row vectors of the channel matrix $H_s$. $h_1, \ldots, h_N$ represent N row vectors of $H_s$, and a length of each vector is M. For example, the PMI is used to represent y row vectors of $H_s$, and y is a positive integer less than or equal to N.

When the PMI is a high-precision PMI, the following form may be used.

When the CSI-RS sent by the network device is a non-precoded CSI-RS or is similar to a class B precoded CSI-RS with K>1 in an LTE system, the PMI includes a PMI 1 and a PMI 2. The PMI 1 indicates a group of base vectors $\{b_1, \ldots, b_L\}$ (when the network device uses a single-polarized antenna, $b_i \in C^{M \times 1}$; and when the network device uses a dual-polarized antenna, $b_i \in C^{(M/2) \times 1}$), where L is a positive integer greater than 1. The PMI 2 includes x groups of linear combination coefficients, and each group of linear combination coefficients includes at least two non-zero coefficients. Each group of linear combination coefficients is used to perform linear combination on the group of base vectors indicated by the PMI 1, and a result of the linear combination is used to represent one eigenvector. For example, y=1, and in one embodiment, the PMI indicates a channel vector $h_1$, and when the network device uses a dual-polarized antenna, the group of base vectors indicated by the PMI 1 forms a matrix $W_1$:

$$W_1 = \begin{bmatrix} b_1 & \ldots & b_L & & & \\ & & & b_1 & \ldots & b_L \end{bmatrix}.$$

The PMI 2 includes a group of linear combination coefficients $[a_1, \ldots, a_{2L}]$, and $$\begin{bmatrix} \sum_{i=1}^{L} a_i b_i \\ \sum_{i=L+1}^{2L} a_i b_{i-L} \end{bmatrix}$$

is used to represent the eigenvector $h_1$. The PMI 1 may also indicate two different groups of base vectors for two polarization directions. This is similar to the above example, and details are not described again. The PMI 1 may also indicate two different groups of base vectors for antenna ports in the two polarization directions. This is similar to the above example, and details are not described again. The PMI 1 is reported for the entire bandwidth, that is, broadband reporting; the PMI 2 is reported for each subband, that is, subband reporting.

When the CSI-RS sent by the network device is similar to a class B precoded CSI-RS with K=1 in an LTE system, the PMI includes a PMI 2. The PMI 2 includes y groups of linear combination coefficients, and each group of linear combination coefficients includes at least two non-zero coefficients. Each group of linear combination coefficients represents one channel vector of an equivalent downlink channel matrix from k antenna ports of the network device to the N antenna ports of the terminal device. The k antenna ports are in the M antenna ports and are selected by the terminal device based on measurement. Therefore, k is an integer less than or equal to M. In this case, in addition to the PMI, the terminal device further needs to feed back third indication information, and the third indication information is used to indicate numbers of the k antenna ports. For example, if precoding matrices corresponding to CSI-RSs of the k antenna ports are respectively $w_1, \ldots, w_k$, the equivalent downlink channel matrix is $H_s[w_1, \ldots, w_k] = \overline{H}_s$, and row vectors are $\overline{h}_1, \ldots, \overline{h}_N$, where y is a positive integer. If y=1, the PMI 2 includes y=1 group of linear combination coefficients $[a_1, \ldots, a_k]$, and the group of coefficients approximately represents $\overline{h}_1$. A larger quantity k of antenna ports selected by the terminal device and more precise quantification of the y groups of linear combination coefficients included in the PMI 2 indicate that a result obtained based on the PMI 2 can represent the eigenvector of the equivalent downlink channel more accurately. Selection of the k antenna ports is reported for the entire bandwidth, that is, broadband reporting; the PMI 2 is reported for each subband, that is, subband reporting. The high-precision PMI indicating a channel vector also belongs to the explicit feedback-based PMI.

When the PMI indicating a channel vector is a low-precision PMI, the following form may be used.

When the CSI-RS sent by the network device is a non-precoded CSI-RS or is similar to a class B precoded CSI-RS with K>1 in an LTE system, the PMI includes a PMI 1 and a PMI 2. The PMI 1 indicates a group of base vectors $\{b_1, \ldots, b_L\}$. For each vector $h_i (i=1, \ldots, y)$, the PMI 2 is used to select a base vector from the group of base vectors when the network device uses a single-polarized antenna, and the PMI 2 is used to select a base vector from the group of base vectors and a phase difference between two polarization directions when the network device uses a dual-polarized antenna. For example, y=2, and in one embodiment, the PMI indicates eigenvectors $h_1$ and $h_2$, and when the network device uses a dual-polarized antenna, the group of base vectors indicated by the PMI 1 forms a matrix $W_1$:

$$W_1 = \begin{bmatrix} b_1 & \ldots & b_L & & & \\ & & & b_1 & \ldots & b_L \end{bmatrix}.$$

The PMI 2 indicates a matrix $W_2$, and $W_2$ has y=2 columns:

$$W_2 = \begin{bmatrix} e_i & e_j \\ \varphi e_i & -\varphi e_j \end{bmatrix}.$$

$e_i$ is a vector with a length L, the $i^{th}$ element is 1, and other elements are 0. $\varphi$ is a phase difference between the two polarization directions, and may be selected from a pre-defined set. For example, the set may be $$\left\{0, \frac{\pi}{2}, \pi, \frac{3\pi}{2}\right\},$$

or may include more values. This is not limited herein. [h$_1$,h$_2$] is approximately represented by $$W_1 W_2 = = \begin{bmatrix} b_i & b_j \\ \varphi b_i & -\varphi b_j \end{bmatrix}$$

based on the PMI 1 and the PMI 2. The PMI 1 may also indicate two different groups of base vectors for antenna ports in the two polarization directions. This is similar to the above example, and details are not described again. The PMI 1 is reported for the entire bandwidth, that is, broadband reporting; the PMI 2 is reported for each subband, that is, subband reporting.

When the CSI-RS sent by the network device is similar to a class B precoded CSI-RS with K=1 in an LTE system, the PMI includes a PMI 2. The PMI 2 indicates a matrix W$_2$, W$_2$ has y=2 columns, and each column selects one antenna port for each polarization direction:

$$W_2 = \begin{bmatrix} e_i & e_j \\ \varphi e_i & -\varphi e_j \end{bmatrix}.$$

e$_i$ is a vector with a length of M/2, the i$^{th}$ element is 1, other elements are 0, and e$_i$ is used to select the i$^{th}$ antenna port from M/2 antenna ports. φ is a phase difference between two polarization directions, and may be selected from a predefined set. For example, the set may be $$\left\{0, \frac{\pi}{2}, \pi, \frac{3\pi}{2}\right\},$$

or may include more values. This is not limited herein. The PMI 2 is reported for each subband, that is, subband reporting. Two row vectors of an equivalent downlink channel matrix are approximately represented by W$_2$. For example, if precoding matrices corresponding to CSI-RSs of the M antenna ports are respectively w$_1$, ..., w$_M$, the equivalent downlink channel matrix is H$_s$[w$_1$, ..., w$_M$], and row vectors are $\bar{h}_1$, ..., $\bar{h}_N$. Appropriate i, j, and φ are selected, and the PMI 2 may approximately represent any two vectors in $\bar{h}_1$, ..., $\bar{h}_N$. When the PMI is selected from predefined codebooks, the low-precision PMI indicating a channel vector also belongs to the codebook-based PMI. When the terminal device selects the PMI from the codebooks, if the receiver of the terminal device is considered, the low-precision PMI indicating a channel vector also belongs to the implicit feedback-based PMI.

Therefore, the low-precision PMI indicating a channel vector may be the explicit feedback-based PMI, the implicit feedback-based PMI, or the codebook-based PMI.

Based on the PMI indicating a channel vector, the network device can obtain an approximate representation of the downlink channel matrix, to provide reference for determining a precoding matrix used for data.

The following further describes the PMI indicating a channel correlation matrix by using the foregoing example.

The PMI indicating a channel correlation matrix is used to indicate a channel correlation matrix. For example, a channel that the network device is interested in is a full channel matrix H$_s$, and a channel correlation matrix is H$_s^H$H$_s$. For example, a channel that is corresponding to some of the N antenna ports of the terminal device and that the network device is interested in is represented as H$_s$' (which is a matrix formed by some rows in the full channel matrix H$_i$), and a channel correlation matrix is H$_s'^H$H$_s$'. In one embodiment, the PMI may be used to indicate a plurality of eigenvectors of the channel correlation matrix (the terminal device needs to report a plurality of eigenvalues of a channel correlation matrix associated with a plurality of eigenvectors). A PMI form is similar to that described in the high-precision PMI indicating a channel eigenvector, and details are not described again. In one embodiment, the PMI may be used to indicate a plurality of row vectors or column vectors of a channel correlation matrix. A PMI form is similar to that described in the PMI indicating a channel vector, and details are not described again. In one embodiment, the PMI indicating a channel correlation matrix may also be used to indicate a broadband channel correlation matrix $$\frac{1}{S}\sum_{s=1}^{S} H_s^H H_s.$$

In one embodiment, the PMI may be used to indicate a plurality of eigenvectors of the broadband channel correlation matrix. A PMI form is similar to that described in the PMI indicating a channel eigenvector, and details are not described again. In one embodiment, the PMI may be used to indicate a plurality of row vectors or column vectors of the broadband channel correlation matrix. A PMI form is similar to that described in the PMI indicating a channel vector, and details are not described again.

Therefore, the first set includes the PMI indicating a channel eigenvector, the PMI indicating a channel vector, the PMI indicating a channel correlation matrix, the explicit feedback-based PMI, and the implicit feedback-based PMI. Precision of each type of PMI may be configured by using another method, for example, is configured by configuration information sent by the network device, or predefined, or recommended by the terminal device. In one embodiment, the first set may further include another PMI type. This is not limited herein. In one embodiment, elements of the first set may be obtained by further splitting the plurality of PMI types based on a feedback type. For example, the first set includes the high-precision PMI indicating a channel eigenvector, the low-precision PMI indicating a channel eigenvector, the high-precision PMI indicating a channel vector, the low-precision PMI indicating a channel vector, the high-precision PMI indicating a channel correlation matrix, the low-precision PMI indicating a channel correlation matrix, the explicit feedback-based PMI, the implicit feedback-based PMI, and the codebook-based PMI. For another example, the first set may include the explicit feedback-based PMI and the codebook-based PMI. An indication precision of the explicit feedback-based PMI and whether the explicit feedback-based PMI indicates a channel vector, a channel eigenvector, or a channel correlation matrix may be configured by using another method, for example, is configured by configuration information sent by the network device, or predefined, or recommended by the terminal device. Similarly, a form of the first set may be modified in a manner similar to that described above, and is not limited to the form in the example.

Based on the description about the PMI types, the concept of the CSI content is further described. For example, a first type of CSI content includes a CQI, an RI, and a first type of PMI (for example, the PMI indicating a channel eigenvector) in the PMIs, a second type of CSI content includes a CQI, an RI, and a second type of PMI (for example, the PMI indicating a channel correlation matrix) in the PMIs, a third type of CSI content includes a CQI and an RI, and a fourth type of CSI content includes only an RI.

It should be noted that if two pieces of CSI include same parameters, for example, both include a CQI/an RI, and a PMI, and the PMI is of a same type, the two pieces of CSI have same content. If two pieces of CSI include different parameters, or two pieces of CSI include different types of PMIs, the two pieces of CSI have different content.

It should be noted that for each type of PMI described above, if only values of an RI and/or a CQI reported together with the PMI are different, a plurality of pieces of corresponding CSI content are the same. For example, if a type of PMI reported by the terminal device is the PMI indicating a channel eigenvector, first CSI content includes a CQI, RI=1, and a PMI indicating a channel eigenvector and corresponding to the CQI/RI, and second CSI content includes a CQI, RI=3, and a PMI indicating a channel eigenvector and corresponding to the CQI/RI, the first CSI content is the same as the second CSI content.

Therefore, in this embodiment of this application, the terminal device may determine CSI content based on a value of the RI, and a beneficial effect is that feedback overheads for the channel state information can compromise with feedback accuracy of the channel state information, and this is more flexible. Therefore, in this embodiment of this application, accuracy of the channel state information PMI can be improved while feedback overheads for the channel state information are reduced, thereby improving system performance.

The following describes in detail the corresponding content of the channel state information determined by the terminal device based on the value of the RI.

It is assumed that on a subband, a downlink channel matrix from the M antenna ports of the network device to the N antenna ports of the terminal device is:

$$H = \begin{bmatrix} H_1 \\ H_2 \end{bmatrix} \in C^{N \times M}.$$

$H_1 \in C^{n \times M}$ is a downlink channel matrix from the M antenna ports of the network device to the n antenna ports in the first antenna port set of the terminal device, and may be obtained by the network device through measurement of an SRS. $H_2 \in C^{(N-n) \times M}$ is a downlink channel matrix from the M antenna ports of the network device to (N−n) antenna ports other than the first antenna port set in the second antenna port set of the terminal device, and is obtained by the terminal device through measurement of a CSI-RS.

In a first optional solution:

When RI≤X1, the content of the channel state information includes a channel quality indicator CQI and/or the RI, and the channel state information does not include a precoding matrix indicator PMI.

In this case, the terminal device needs to calculate the CQI based on a PMI hypothesis. Because the PMI is not fed back, the network device knows only the partial channel matrix $H_1$, the terminal device needs to assume, based on the channel matrix $H_1$, a PMI used by the network device. The terminal device may assume, according to a predefined rule, a rule indicated by the network device, or a rule assumed by the terminal device based on measurement, the PMI used by the network device in this case. In one embodiment, the terminal device first determines the RI through measurement of the CSI-RS, and assumes that with the RI, the network device uses RI primary eigenvectors of the matrix $H_1$ as a precoding matrix on a corresponding subband, and the terminal device may obtain a signal to interference plus noise ratio or another parameter of a received signal based on the PMI hypothesis, the RI, and a receiver (such as an MMSE receiver or an MMSE-IRC receiver) used by the terminal device, to obtain the CQI. In one embodiment, the terminal device may alternatively assume that the network device uses RI primary eigenvectors of a broadband channel correlation matrix (a definition is in the related content of the high-precision PMI indicating a channel correlation matrix) of the matrix $H_1$ as a precoding matrix on each subband, and the terminal device may obtain a signal to interference plus noise ratio or another parameter of a received signal based on the PMI hypothesis, the RI, and a receiver used by the terminal device, to obtain the CQI. In one embodiment, the terminal device may also calculate the CQI by using another method. This is not limited herein.

When RI>X1, the content of the channel state information includes the CQI and/or the RI, and the channel state information further includes the PMI, where X1 is a positive integer less than or equal to N.

In one embodiment, the CQI is determined based on the RI and the PMI. In one embodiment, the terminal device first determines the RI through measurement of the CSI-RS. The terminal device determines the PMI based on the RI and an estimation result of the downlink channel matrix H, and the terminal device may obtain a signal to interference plus noise ratio or another parameter of a received signal based on the PMI, the RI, and a receiver of the terminal device (such as an MMSE receiver or an MMSE-IRC receiver), to obtain the CQI. In one embodiment, the CQI may also be calculated in another manner. This is not limited.

In other words, when RI≤X1, the channel state information does not include the PMI, and when RI>X1, the channel state information includes the PMI.

It should be understood that in this embodiment of this application, a value of X1 may be a system default value, a value determined by the terminal device, or a value indicated by the network device. This is not limited in this embodiment of this application.

For example, the value of X1 may be 1 or 2, and is not limited in this embodiment of this application.

When X1=1, when RI≤1, the channel state information fed back by the terminal device does not include the PMI, and when RI>1, the channel state information fed back by the terminal device includes the PMI.

In one embodiment, when RI=1, there is only one data layer in downlink communication between the network device and the terminal device, and therefore, the terminal device does not feed back an accurate PMI, so that the network device transmits data by using the PMI obtained based on the partial channel matrix $H_1$. A caused performance loss is acceptable, and has little impact on overall network performance (in general, total network throughput is mainly determined by performance of a terminal device that simultaneously transmits a plurality of data streams in downlink communication, that is, RI>1). In addition, a channel eigenvector obtained by the network device based on the partial channel matrix $H_1$ is slightly different from a channel eigenvector obtained by the network device based on the full channel matrix H. Therefore, the eigenvector obtained based on the partial channel matrix is used to determine a precoding matrix used for data, a relatively small performance loss is caused, and relatively small multi-user interference is also caused to another terminal device. Therefore, the terminal device may not feed back the PMI, and this can greatly reduce the resource overheads for the channel state information and improve system performance.

When RI>1, the channel state information fed back by the terminal device includes the PMI. In this way, the terminal device feeds back the PMI, so that the network device can obtain complete channel state information, and can further process data based on the accurate channel state information, thereby improving data transmission efficiency and the system performance.

Similarly, when X1=2, 3, ..., for example, when X1=2, when RI≤2, the channel state information fed back by the terminal device does not include the PMI, and when RI>2, the channel state information fed back by the terminal device includes the PMI.

In one embodiment, when RI≤X1, for example, RI≤2, it may be considered that a value of the RI is relatively small, that is, there are a relatively small quantity of data layers between the network device and the terminal device. Therefore, the terminal device may not feed back the PMI obtained based on the full channel matrix H, and the network device may obtain a precoding matrix based on the obtained partial channel matrix $H_1$. It may be considered that relatively small interference is caused between relatively small RI layers of data, and a downlink data transmission rate loss is relatively small. Therefore, the terminal device may not feed back the PMI when RI≤X1, and this can greatly reduce the resource overheads for the channel state information and improve the system performance.

When RI>X1, the CSI content reported by the terminal device includes the PMI. For terminal devices with RI>X1, an increase in downlink data transmission performance of the terminal devices is more critical to an increase in a total network throughput. Therefore, PMIs reported by these terminal devices based on the full channel matrix H match the matrix H more closely, interference between RI layers of data streams and interference between a plurality of terminal devices are greatly reduced, and this facilitates an increase in the system performance.

For example, if the content of the channel state information reported by the terminal device is carried in an uplink control channel (for example, a physical uplink control channel (PUCCH)), time-frequency-code resources required to carry the content of the channel state information in the PUCCH is configured by the network device in advance by using signaling. In this case, the terminal device may first report the RI (for example, in a periodic CSI reporting mode, the terminal device reports the RI in a relatively long period, and subsequent reporting of the PMI and/or CQI is calculated based on a last reported RI), and the network device determines, based on a comparison between RI and X1, whether to allocate time-frequency-code resources for subsequently reporting the PMI. If RI≤X1, the network device does not allocate the time-frequency-code resources for reporting the PMI, reducing overheads used by the terminal device to report the CSI. In this case, the time-frequency-code resources can be allocated to other terminal devices, to implement PUCCH multiplexing of more terminal devices and improve utilization efficiency of system time-frequency-code resources. If RI>X1, the network device allocates the time-frequency-code resources for reporting the PMI by using signaling (such as downlink control information (DCI), a multiple access channel control element (MAC CE), or radio resource control (RRC) signaling). The time-frequency-code resources are no longer allocated to other terminal devices, avoiding collisions of time-frequency-code resources of PUCCHs of a plurality of terminal devices. If the content of the channel state information reported by the terminal device is carried in an uplink shared channel (PUSCH), time-frequency-code resources required to carry the content of the channel state information in the PUSCH is configured by the network device in advance by using signaling. In this case, the terminal device may first report the RI, and the network device determines, based on a comparison between RI and X1, whether to allocate time-frequency-code resources for subsequently reporting the PMI. If RI≤X1, the network device does not allocate the time-frequency-code resources for reporting the PMI, reducing overheads used by the terminal device to report the CSI. In this case, the time-frequency-code resources can be allocated for uplink data transmission, improving utilization efficiency of system time-frequency-code resources. If RI>X1, the network device allocates, by using signaling (such as downlink control information DCI), the time-frequency-code resources for reporting the PMI. The network device flexibly determines whether to allocate the resources for reporting the PMI, and improvement of the utilization efficiency of the time-frequency-code resources can compromise with improvement of PMI feedback accuracy.

It should be understood that, in the first optional solution, the PMI in the channel state information may be any type of PMI in the first set. This is not limited in this embodiment of this application.

It should be emphasized that, it is specified that the content of the channel state information does not include the PMI when RI=X1. In one embodiment, when RI=X1, the content of the channel state information may include the PMI. In actual application, the content of the channel state information may be flexibly selected. This is not limited in this embodiment of this application.

In a second optional solution:

When RI≤X2, the content of the channel state information includes a CQI and/or the RI, and the channel state information further includes a first PMI.

When RI>X2, the content of the channel state information includes a CQI and/or the RI, and the channel state information further includes a second PMI.

It should be understood that the first PMI and the second PMI are different elements in the first set, and each element in the first set represents a different PMI type. The first set includes at least two PMI types in the PMI indicating a channel eigenvector, the PMI indicating a channel vector, the PMI indicating a channel correlation matrix, the explicit feedback-based PMI, the implicit feedback-based PMI, and the codebook-based PMI, and X2 is a positive integer less than or equal to N.

In other words, the first PMI and the second PMI are of different types. For example, the first PMI is the codebook-based PMI, and the second PMI is the PMI indicating a channel eigenvector; the first PMI is the implicit feedback-based PMI, and the second PMI is the explicit feedback-based PMI (for example, the PMI indicating a channel matrix, an eigenvector, or a correlation matrix); the first PMI is the high-precision PMI indicating an eigenvector, and the second PMI is the high-precision PMI indicating a channel correlation matrix.

Therefore, in this embodiment of this application, a type of the PMI in the channel state information may be flexibly determined based on a value relationship between a value of the RI and X2, to flexibly compromise between reducing feedback overheads for the channel state information and improving system performance. For example, the first PMI is a low-precision PMI (such as the low-precision PMI indicating a channel eigenvector), and the second PMI is a high-precision PMI (such as the high-precision PMI indicating a channel eigenvector). When RI is less than X2, the first PMI is fed back, to reduce the feedback overheads for the channel state information. When RI is greater than X2, the first PMI is fed back, to improve the system performance.

For example, the first PMI may be a low-precision PMI indicating a channel eigenvector, for example, the first PMI is used to indicate RI eigenvectors of a downlink channel matrix from the k antenna ports to N or (n+X2) antenna ports. The second PMI may be a high-precision PMI indicating a downlink channel vector, for example, the PMI is used to indicate X2 downlink channel vectors, and each of the X2 downlink channel vectors is a downlink channel vector from the k antenna ports to one of X2 antenna ports in the second antenna port set. In one embodiment, when the network device sends a non-precoded CSI-RS, the k antenna ports are the M antenna ports through which the network device sends the second reference signal, that is, k=M. In one embodiment, when the network device sends a precoded CSI-RS, the k antenna ports are selected by the terminal device from the M antenna ports through which the network device sends the second reference signal. A value of X2, and/or the X2 antenna ports may be notified by the network device to the terminal device by sending signaling, for example, the X2 antenna ports may be in (N−n) antenna ports other than the first antenna port set in the second antenna port set, that is, X2 is a positive integer less than or equal to (N−n). The X2 antenna ports may also include ports in the first antenna port set. In this example, if the terminal device reports the first PMI, the reported CQI is determined based on the RI and the first PMI. In one embodiment, the terminal device first determines the RI through measurement of the CSI-RS. The terminal device determines the first PMI based on the RI and an estimation result of the downlink channel matrix H, and the terminal device may obtain a signal to interference plus noise ratio or another parameter of a received signal based on the first PMI, the RI, and a receiver of the terminal device (such as an MMSE receiver or an MMSE-IRC receiver), to obtain the CQI. In one embodiment, the CQI may also be calculated in another manner. This is not limited. Due to low precision, a relatively small quantity of time-frequency resources are occupied to report the PMI. If the second PMI is reported, the reported CQI is determined based on the RI, the second PMI, and a channel matrix between the k antenna ports and the n antenna ports. In one embodiment, the terminal device first determines the RI through measurement of the CSI-RS. The terminal determines the second PMI based on the RI and the estimation result of the downlink channel matrix H. Based on a channel matrix represented by the second PMI, the channel matrix that is between the k antenna ports and the n antenna ports and that is obtained by the network device through measurement of the SRS (which may also be measured by the terminal), and a predefined rule or a rule notified by the network device, the terminal assumes a precoding matrix used by the network device. The terminal device may obtain a signal to interference plus noise ratio or another parameter of a received signal based on the RI, the precoding matrix, and a receiver of the terminal device (such as an MMSE receiver or an MMSE-IRC receiver), to obtain the CQI. Due to high precision, a relatively large quantity of time-frequency resources are occupied to report the PMI, but the system performance can be effectively improved.

In another embodiment, the method in this embodiment of this application may further include:

The terminal device sends second indication information, to indicate a type of the first PMI or the second PMI. The network device may determine the reported PMI type based on the second indication information, to determine a downlink precoding matrix. For example, if the first PMI indicates RI eigenvectors of a downlink channel matrix from the M antenna ports of the network device to the N or (n+X2) antenna ports, the network device learns of, based on the PMI, an eigenvector of a downlink channel matrix from the network device to the terminal device. In a single-user transmission mode, the RI eigenvectors may be used as the precoding matrix for data. During multi-user transmission, the network device may determine, based on information such as the RI eigenvectors and PMIs reported by other terminal devices, the precoding matrix used for data. If the first PMI indicates a channel vector of a downlink channel matrix from the M antenna ports of the network device to (N−n) non-transmit antenna ports of the terminal, the network device may obtain information about a full channel matrix based on the PMI and the channel vector that is between the M antenna ports and the n transmit antenna ports and that is measured by the network device based on the SRS. In the single-user transmission mode, RI eigenvectors of the full channel matrix may be used as the precoding matrix for data. During multi-user transmission, the network device may determine, based on information such as the full channel matrix and PMIs reported by other terminal devices, the precoding matrix used for data.

Alternatively, the terminal device sends the second indication information, and the second indication information indicates a value of N. The network device may determine a value relationship between RI and (N−n) based on the value of N and the RI that is reported by the terminal device, so that the network device determines whether the type of PMI reported by the terminal device is the first PMI or the second PMI, to determine the downlink precoding matrix. A determining manner is described above, and details are not described again.

In other words, because the terminal device can flexibly determine the content of the channel state information based on different values of the RI, the terminal device can send the second indication information to indicate a type of the PMI in the fed back channel state information, so that the network device determines the type of the PMI based on the second indication information, to determine the precoding matrix.

For example, if the content of the channel state information reported by the terminal device is carried in an uplink control channel (e.g., PUCCH), time-frequency-code resources required to carry the content of the channel state information in the PUCCH is configured by the network device in advance by using signaling. In this case, the terminal device may first report the RI (for example, in a periodic CSI reporting mode, the terminal device reports the RI in a relatively long period, and subsequent reporting of the PMI and/or CQI is calculated based on a last reported RI), and the network device determines, based on a comparison between RI and X2, whether to allocate time-frequency-code resources for subsequently reporting the PMI. If RI≤X2, the network device allocates, through signaling (such as DCI, a MAC CE, or RRC), time-frequency-code resources for reporting the first PMI. If RI>X2, the network device allocates, through signaling (such as DCI, a MAC CE, or RRC signaling), time-frequency-code resources for reporting the second PMI. If the content of the channel state information reported by the terminal device is carried in an uplink shared channel (e.g., PUSCH), time-frequency-code resources required to carry the content of the channel state information in the PUSCH is configured by the network device in advance by using signaling. In this case, the terminal device may first report the RI, and the network device determines, based on a comparison between RI and X1, whether to allocate time-frequency-code resources for subsequently reporting the PMI. If RI≤X1, the network device does not allocate time-frequency-code resources for reporting the first PMI. If RI>X1, the network device allocates, by using signaling (such as DCI), the time-frequency-code resources for reporting the second PMI. When the first PMI and the second PMI are reported by using different overheads, the network device can flexibly allocate, by comparing RI and X2, the time-frequency-code resources required to report the PMI, thereby improving utilization efficiency of system time-frequency-code resources.

It should be understood that, in this embodiment of this application, when the terminal device and the network device determine the content of the channel state information based on the value relationship between the value of the RI and the preset X2, because both the network device and the terminal device know the value of X2, when the content of the channel state information includes the RI, the terminal device may not send the second indication information to the network device, and the network device may determine the type of the PMI based on the relationship between RI and X2.

It should be understood that in this embodiment of this application, the value of X2 may be a system default value, a value determined by the terminal device, or a value indicated by the network device. This is not limited in this embodiment of this application.

In another embodiment, X2 may be equal to P, P is a quantity of antenna ports included in a third antenna port set, the third antenna port set is a proper subset of the second antenna port set, the third antenna port set is different from the first antenna port set, 1≤P≤N−n, and P is an integer.

For example, the second antenna port set is a universal set, and the third antenna port set is a complementary set of the first port set.

In other words, the P antenna ports in the third port set are all or some of the (N−n) antenna ports other than the n antenna ports in the N antenna ports.

It should be particularly noted that when the P antenna ports in the third port set are all of the (N−n) antenna ports other than the n antenna ports in the N antenna ports, that is, the third antenna port set is a complement set of the first port set, and when a union of the third antenna port set and the first port set is the second port set, P=N−n.

When X2 is equal to P, and a value of P is indicated by the network device, before 230, the method may further include:

sending, by the network device, a first indication message, where the first indication message is used to indicate the third antenna port set.

For example, the first indication information indicates P antenna ports in the third antenna port set that are in the (N−n) antenna ports other than the n antenna ports in the N antenna ports.

In one embodiment, when X2=P, in the second optional solution:

when RI≤P, the content of the channel state information includes a CQI and/or the RI, and the channel state information further includes the first PMI; and when RI>P, the content of the channel state information includes a CQI and/or the RI, and the channel state information further includes the second PMI.

It should be noted that P represents a quantity of ports in the third port set, and therefore, when X2=P, it may also be described that the content of the channel state channel in this embodiment of this application is associated with a value relationship between RI and P.

In one embodiment, when 1<RI≤P, the content of the channel state information includes the first PMI, where the first PMI is used to indicate RI eigenvectors of a downlink channel matrix from the k antenna ports to the N antenna ports or (n+P) antenna ports, the k antenna ports are antenna ports through which the second reference signal is sent, and k is a positive integer.

The k antenna ports may be the M antenna ports of the network device or k antenna ports selected by the terminal device from the M antenna ports, for example, selected based on receive power or receive quality of a CSI-RS of each antenna port.

In one embodiment, P may be an integer less than (N−n). When the N antenna ports of the terminal device are sheltered/blocked due to holding the terminal device by a hand or other factors, the RI eigenvectors of a downlink channel from the k antenna ports to all the N antenna ports of the terminal is fed back, and this may cause performance degradation. This is because receive power of a received signal of blocked antenna ports is very low, channel estimation results corresponding to the blocked antenna ports are very inaccurate, and the RI eigenvectors are also inaccurate in this case. In contrast, measurement of only RI eigenvectors of a downlink channel from the k antenna ports to (n+P) antenna ports of the terminal is more accurate, and the P antenna ports are unblocked ports in (N−n) non-transmit antenna ports. Similarly, the terminal device may have a plurality of antenna port groups (for example, each antenna port group includes a plurality of antenna ports on one antenna panel) and send the SRS through only n antenna ports in one antenna port group. In this case, the network device further expects to know channel state information corresponding to P antenna ports in another antenna port group. In this case, the terminal device only needs to feed back eigenvectors of channels corresponding to (n+P) antenna ports, and does not need to feed back eigenvectors of channels corresponding to all receiving antenna ports. In one embodiment, P may be equal to (N−n). In this case, the terminal device feeds back the RI eigenvectors that are of the downlink channel matrix from the k antenna ports to the N antenna ports and that are indicated by the first PMI.

When P=N−n, the second indication information sent by the terminal device may be used to indicate the value of N. The network device may determine a value relationship between RI and (N−n) based on the value of N and the RI that is reported by the terminal device, so that the network device determines whether the type of PMI reported by the terminal device is the first PMI or the second PMI, to determine the downlink precoding matrix. A determining manner is described above, and details are not described again.

Based on the first PMI, the network device may obtain the full channel matrix H or an eigenvector of a partial matrix that is in the matrix H and that the network device is interested in, to determine the precoding matrix used for data.

When RI>P, the content of the channel state information includes the second PMI, and the second PMI is used to indicate a correlation matrix of the downlink channel matrix from the k antenna ports to the P antenna ports. As described above, a manner of feeding back a correlation matrix may be to feed back P eigenvectors of the matrix. In this case, the terminal device further needs to report related information of P non-zero eigenvalues, and the P non-zero eigenvalues are associated with the P reported eigenvectors. In one embodiment, the P eigenvalues may be directly quantized and reported as the related information of the eigenvalues. In one embodiment, the eigenvalues may first be divided by a numeric Y, to obtain the related information of the eigenvalues. The numeric Y is selected properly, and a benefit of dividing by the numeric Y is to reduce a quantized interval and a quantity of bits required for quantization. In one embodiment, the numeric Y may be predefined or notified by the network device. In one embodiment, the numeric Y may be a maximum non-zero eigenvalue of a correlation matrix of the partial channel matrix $H_1$. Because the network device already obtains the maximum non-zero eigenvalue of $H_1$ through measurement of the SRS, the network device can recover the eigenvalue based on the related information of the eigenvalue reported by the terminal device. The network device can recover the correlation matrix of the downlink channel matrix from the k antenna ports to the P antenna ports based on the P eigenvectors and the P eigenvalues. In addition, the network device already obtains the correlation matrix of the partial channel matrix $H_1$ through measurement of the SRS. Therefore, the network device can obtain the correlation matrix of the full channel matrix H, to further determine the precoding matrix used for data.

In one embodiment, when RI>P, the second PMI may be of another type. For example, when RI>P, the content of the channel state information includes the second PMI, and the second PMI is used to indicate P channel vectors of the downlink channel matrix from the k antenna ports to the P antenna ports. Each channel vector is a channel vector between the first of the P antenna ports and the k antenna ports, and is a vector with a length k.

The advantage of determining, by comparing the value relationship between RI and P, whether to report the first PMI or the second PMI is that the network device can obtain the information about the full channel matrix H with lowest feedback overheads. It is assumed that the terminal device feeds back, with same precision, the eigenvectors indicated by the first PMI and the eigenvectors of the correlation matrix that are indicated by the second PMI. For example, two types of PMIs are fed back by using the previously PMI1+PMI2 method, the PMI 1 is broadband feedback, and the PMI 2 is sub-band feedback. A PMI 1 indicates a group of base vectors $\{b_1, \ldots, b_L\}$, and L is the same in feedback of the two PMI types. A PMI 2 includes a plurality of groups of linear combination coefficients, each group of linear combination coefficients includes L non-zero coefficients, and a quantity of quantized bits of each coefficient is the same in feedback of the two PMI types. The PMI 1 brings same feedback overheads regardless of whether the first PMI or the second PMI is fed back. When the first PMI is fed back, the PMI 2 includes RI groups of linear combination coefficients, and when the second PMI is fed back, the PMI 2 includes P groups of linear combination coefficients. Therefore, when 1<RI≤P, PMI 2 reporting overheads caused by reporting the first PMI is less than PMI 2 reporting overheads caused by reporting the second PMI; and when RI>P, the PMI 2 reporting overheads caused by reporting the second PMI is less than the PMI 2 reporting overheads caused by reporting the first PMI. Therefore, the advantage of determining, by comparing the value relationship between RI and P, whether to report the first PMI or the second PMI is that the network device can obtain the information about the full channel matrix H with lowest feedback overheads. In another example, it is assumed that the terminal device feeds back, with the same precision, the eigenvectors indicated by the first PMI and the correlation matrix indicated by the second PMI. As described above, the correlation matrix may be reported by reporting a non-zero eigenvalue of the correlation matrix and an eigenvector corresponding to the non-zero eigenvalue. Because a correlation matrix of the downlink channel matrix from the k antenna ports to the P antenna ports has a maximum of P non-zero eigenvalues, the second PMI needs to indicate a maximum of P eigenvectors. Therefore, when 1<RI≤P, PMI 2 reporting overheads caused by reporting the first PMI is less than PMI 2 reporting overheads caused by reporting the second PMI; and when RI>P, the PMI 2 reporting overheads caused by reporting the second PMI is less than the PMI 2 reporting overheads caused by reporting the first PMI.

Therefore, in this embodiment of this application, the terminal device determines the content of the fed back channel state channel based on the value relationship between RI and P, and can determine whether the PMI in the fed back channel state information is an eigenvector or a channel correlation matrix. Therefore, the channel state information may be reported by using lowest overheads, so that the network device obtains complete CSI, and system performance can be improved.

For example, if the content of the channel state information reported by the terminal device is carried in an uplink control channel (e.g., PUCCH), time-frequency-code resources required to carry the content of the channel state information in the PUCCH is configured by the network device in advance by using signaling. In this case, the terminal device may first report the RI (for example, in a periodic CSI reporting mode, the terminal device reports the RI in a relatively long period, and subsequent reporting of the PMI and/or CQI is calculated based on a last reported RI), and the network device determines, based on a comparison between RI and P, whether to allocate time-frequency-code resources for subsequently reporting the PMI. If 1<RI≤P, the network device allocates, through signaling (such as DCI, a MAC CE, or RRC), time-frequency-code resources for reporting the first PMI. If RI>P, the network device allocates, through signaling (such as DCI, MAC CE, or RRC signaling), time-frequency-code resources for reporting the second PMI. If the content of the channel state information reported by the terminal device is carried in an uplink shared channel (e.g., PUSCH), time-frequency-code resources required to carry the content of the channel state information in the PUSCH is configured by the network device in advance by using signaling. In this case, the terminal device may first report the RI, and the network device determines, based on a comparison between RI and X1, whether to allocate time-frequency-code resources for subsequently reporting the PMI. If 1<RI≤P, the network device does not allocate time-frequency-code resources for reporting the first PMI. If RI>P, the network device allocates, by using signaling (such as DCI), time-frequency-code resources for reporting the second PMI. By comparing RI with P, the network device can allocate a relatively small quantity of time-frequency-code resources to the terminal device to report the PMIs, to minimize reporting overheads, and can also obtain the complete CSI, to improve system performance.

It should be understood that the content of the channel state information is associated with the RI and the quantity P of antenna ports in the third antenna port set. The content of the channel state information is respectively described when 1<RI≤P and when RI>P. It should be particularly noted that, when RI=1, regardless of the value of P, the channel state information fed back by the terminal device may include only the CQI and/or RI, but not include the PMI. In one embodiment, when RI=1, the channel state information fed back by the terminal device may further include the PMI, for example, the PMI is the first PMI or the second PMI. This is not limited in this embodiment of this application.

It should be emphasized that, it is specified that the content of the channel state information includes the first PMI when RI=P. In one embodiment, when RI=P, the content of the channel state information may not include the first PMI, but include the second PMI. In actual application, the content of the channel state information may be flexibly selected. This is not limited in this embodiment of this application.

The following describes the forms of the first PMI and the second PMI when X2=P.

It should be understood that P may indicate P antenna ports in the (N−n) antenna ports other than the n antenna ports in the N antenna ports. P may be equal to (N−n), or may be less than (N−n). This is not limited in this embodiment of this application.

In one embodiment, the terminal device sends a non-beamformed (non-precoded) SRS of the n antenna ports in an uplink channel. The network device obtains an uplink channel $H_1^T \in C^{n \times M}$ from the n transmit ports to the network device through measurement of the SRS.

The network device sends a non-beamformed (non-precoded/non-beamformed) CSI-RS through the M antenna ports.

The terminal device measures the CSI-RS and estimates the downlink channel matrix $$H = \begin{bmatrix} H_1 \\ H_2 \end{bmatrix} \in C^{(n+P) \times k}$$

from the k antenna ports of the network device to the (n+P) antenna ports of the terminal.

$H_2 \in C^{P \times k}$ represents a downlink channel matrix from the network device to other P non-transmit ports of the terminal.

The terminal device feeds back the CSI based on a measurement result, where the CSI includes the CQI and/or the RI.

When 1<RI≤P, the CSI further includes the first PMI. The first PMI includes base vector indication information (denoted by a PMI 11 herein) and RI groups of linear combination coefficients (denoted by a PMI 12 herein). The PMI 11 is used to indicate a group of base vectors $\{b_1, \ldots, b_L\}$ (that is, the PMI 1 described above; when the network device uses a single-polarized antenna, $b_i \in C^{M \times 1}$, and when the network device uses dual polarization directions, $b_i \in C^{M/2 \times 1}$). The PMI 12 is used to perform linear combination on the group of base vectors indicated by the PMI 1, to obtain RI eigenvectors (the PMI12 is the PMI 2 described above). One group of linear combination coefficients is used to perform linear combination on the group of base vectors, to represent one eigenvector. The RI eigenvectors are used to represent eigenvectors $v_1, \ldots, v_{RI}$ of a downlink channel matrix $H^H H$. For detailed descriptions of the PMI 1 and the PMI 2, refer to the above descriptions. Details are not described herein again.

When RI>P, the CSI further includes the second PMI. The second PMI includes base vector indication information (denoted by a PMI 21 herein) and P groups of linear combination coefficients (denoted by a PMI 22 herein). The PMI 21 is used to indicate a group of base vectors (that is, the PMI 1 described above) (when the network device uses a single-polarized antenna, $b_i \in C^{M \times 1}$, and when the network device uses dual polarization directions, $$H_2 = \begin{bmatrix} h_1^T \\ \ldots \\ h_P^T \end{bmatrix},$$

The PMI 22 is used to perform linear combination on the group of base vectors indicated by the PMI 1 (the PMI 22 is the PMI2 described above), to obtain P eigenvectors of the correlation matrix of the downlink channel matrix from the k antenna ports to the P antenna ports. In this case, the terminal device further reports related information of P non-zero eigenvalues of the correlation matrix of the downlink channel matrix from the k antenna ports to the P antenna ports. For example, the downlink channel matrix from the k antenna ports of the network device to the P antenna ports of the terminal is $$H_2 = \begin{bmatrix} h_1^T \\ \ldots \\ h_P^T \end{bmatrix},$$

where $h_i \in C^{M \times 1}$, and P eigenvectors of $H_2^H H_2$ may be represented by the PMI 21 and the PMI 22.

In one embodiment, when RI>P, the CSI further includes the second PMI. The second PMI includes base vector indication information (denoted by a PMI 31 herein) and P groups of linear combination coefficients (denoted by a PMI 32 herein). The PMI 31 is used to indicate a group of base vectors $\{b_1, \ldots, b_L\}$ (that is, the PMI 1 described above) (when the network device uses a single-polarized antenna, $b_i \in C^{M \times 1}$, and when the network device uses dual polarization directions, $b_i \in C_{M/2 \times 1}$). The PMI 32 is used to perform linear combination on the group of base vectors indicated by the PMI 1 (the PMI 22 is the PMI2 described above), to obtain P channel vectors of the downlink channel matrix from the k antenna ports to the P antenna ports. For example, if the downlink channel matrix from the k antenna ports of the network device to the P antenna ports of the terminal is $$b_i \in C^{\frac{M}{2} \times 1}).$$

where $h_i \in C^{M \times 1}$ is a channel vector from the M antenna ports of the network device to the $i^{th}$ antenna port of the P non-transmit antenna ports of the terminal device, and P channel vectors $h_1, \ldots, h_P$ of $H_2$ may be represented by the PMI 31 and the PMI 32.

It should be understood that a value of k may be M, or may be a numeric less than M. This is not limited in this embodiment of this application. In addition, k may represent the quantity of ports through which the second reference signal is sent. For example, if the network device sends the precoded second reference signal (e.g., CSI-RS) through the M antenna ports, and the terminal device learns, by measuring the CSI-RS, that channel states corresponding to some of the M antenna ports are relatively poor, channel state information corresponding to the antenna ports with relatively poor channel states may not be reported, and the terminal selects to report downlink channel state information from only the k antenna ports in the M antenna ports to the terminal device.

In one embodiment, when the k antenna ports determined by the terminal device are some in the M antenna ports through which the second reference signal is sent, the method 200 in this embodiment of this application may further include:

sending, by the terminal device, third indication information, to indicate the k antenna ports.

For example, the third indication information indicates numbers or identifiers of the k antenna ports, or the third indication information indicates k antenna ports that are in the M antenna ports and that are corresponding to the state information reported by the terminal device.

For another example, when the second reference signal is a precoded reference signal, the first PMI indicates RI groups of linear combination coefficients, and each group of linear combination coefficients is used to represent one eigenvector.

The second PMI indicates P groups of coefficients, and each group of coefficients is used to represent one of the P eigenvectors of the correlation matrix of the downlink channel matrix from the k antenna ports to the P antenna ports.

In one embodiment, for example, P indicates P antenna ports in the (N−n) antenna ports other than the n antenna ports in the N antenna ports. P may be equal to (N−n), or may be less than (N−n). This is not limited in this embodiment of this application.

The terminal device sends a non-beamformed (non-precoded) SRS of the n antenna ports in the uplink channel.

The network device obtains an uplink channel $H_1^T \in C^{n \times M}$ from n transmit ports to the network device through measurement of the SRS, $A^T$ represents a transpose of a matrix A, and n is a positive integer.

The network device sends the beamformed (precoded/beamformed) CSI-RS through the M antenna ports in the downlink channel. Each antenna port corresponds to one precoding matrix, and a CIS-RS sent through the port is precoded by using a corresponding precoding matrix. $W=[w_1, \ldots, w_m] \in C^{M_1 \times M}$, where $w_i \in C^{M_1 \times 1}$ represents the precoding matrix of the $i^{th}$ antenna port (i=1, \ldots, M), and $M_1$ represents a quantity of antennas or transmitting and receiving units of the network device. In one embodiment, the precoding matrix W is determined by the network device, and is not known by the terminal device.

The terminal device measures the CSI-RS of the M antenna ports, to estimate an equivalent channel $$\overline{H} = HW = \begin{bmatrix} H_1 W \\ H_2 W \end{bmatrix} \in C^{N \times m}$$

from the M antenna ports to the terminal device. $H_2 \in C^{(P) \times M}$ represents the downlink channel matrix from the network device to the P antenna ports of the terminal.

The terminal device feeds back port selection information and/or the CSI based on a measurement result of the equivalent channel. The port selection information is used to instruct the network device to select the k antenna ports from the M antenna ports, and k is a positive integer less than or equal to M. The CSI includes the CQI and/or the RI.

When 1<RI≤N−n, the CSI further includes the first PMI. The first PMI indicates RI groups of linear combination coefficients, and each group of linear combination coefficients includes k coefficients. Each group of linear combination coefficients is used to represent one eigenvector. The RI groups of coefficients respectively represent eigenvector of an equivalent channel matrix $\overline{H}_k^H \overline{H}_k$ corresponding to the selected k antenna ports, and $\overline{H}_k \in C^{(n+P) \times k}$ represents a matrix including k column vectors of $\overline{H}$ corresponding to the k antenna ports selected by the terminal device. It should be understood that the first PMI may be used to instruct the network device to perform linear combination on precoding matrices corresponding to the selected k antenna ports, to obtain the precoding matrix used for data transmission.

When RI>N−n, the CSI further includes the second PMI, the second PMI indicates P groups of coefficients, and each group of coefficients includes k coefficients. The P groups of coefficients respectively correspond to P eigenvectors corresponding to the P non-zero eigenvalues of the correlation matrix of the equivalent downlink channel $$\overline{H}_2 = H_2 W = \begin{bmatrix} \overline{h}_1^T \\ \ldots \\ \overline{h}_P^T \end{bmatrix},$$

from the k antenna ports of the network device selected by the terminal device to the P antenna ports of the terminal device. In one embodiment, the CSI further includes related information of the P non-zero eigenvalues of the correlation matrix.

In one embodiment, when RI>N−n, the CSI further includes the second PMI, the second PMI indicates P groups of coefficients, and each group of coefficients includes k coefficients. The P groups of coefficients respectively correspond to P row vectors $\overline{h}_1, \ldots, \overline{h}_P$ of the equivalent downlink channel $$\overline{H}_2 = H_2 W = \begin{bmatrix} \overline{h}_1^T \\ \ldots \\ \overline{h}_P^T \end{bmatrix}$$

from the k antenna ports of the network device selected by the terminal device to the P antenna ports of the terminal device.

In one embodiment, when the k antenna ports determined by the terminal device are some in the m antenna ports through which the second reference signal is sent, the method 200 in this embodiment of this application may further include:

sending, by the terminal device, third indication information, to indicate the k antenna ports.

For example, the third indication information indicates numbers or identifiers of the k antenna ports, or the third indication information indicates k antenna ports that are in the m antenna ports and that are corresponding to the state information reported by the terminal device.

The foregoing describes the channel state information transmission method in the embodiments of this application with reference to FIG. 2. It should be noted that examples in FIG. 2 are merely used to help a person skilled in the art to understand the embodiments of this application, and the embodiments of this application are not limited to a value or scenario in the examples. Apparently, a person skilled in the art can perform various equivalent modifications or changes based on the example provided in FIG. 2, and such modifications or changes also fall within the scope of the embodiments of this application.

Figure 3:
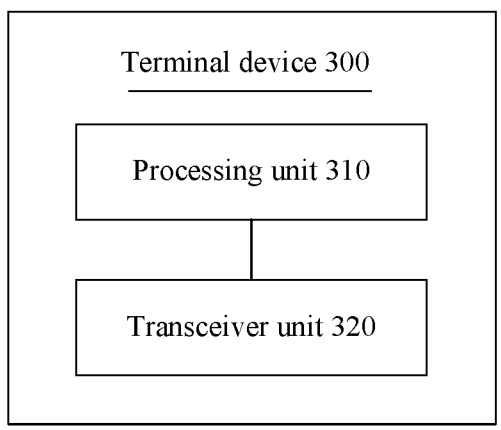
FIG. 3 is a schematic block diagram of a terminal device according to an embodiment of this application.
Figure 4:
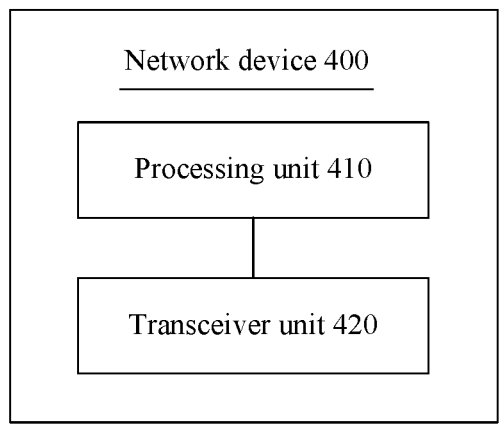
FIG. 4 is a schematic block diagram of a network device according to an embodiment of this application.
Figure 5:
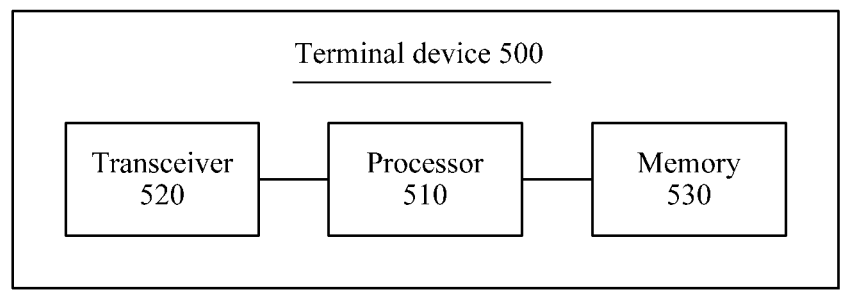
FIG. 5 is a schematic block diagram of a terminal device according to another embodiment of this application.
Figure 6:
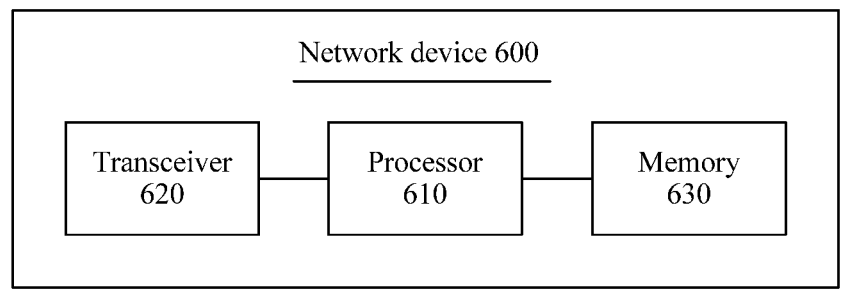
FIG. 6 is a schematic block diagram of a network device according to another embodiment of this application.

The following describes a terminal device in embodiments of this application with reference to FIG. 3 and FIG. 5, and describes a network device in embodiments of this application with reference to FIG. 4 and FIG. 6.

FIG. 3 shows a schematic block diagram of a terminal device 300 according to an embodiment of this application. In one embodiment, as shown in FIG. 3, the terminal device 300 includes a processing unit 310 and a transceiver unit 320.

In one embodiment, the processing unit 310 controls the transceiver unit 320 to send a first reference signal through a first antenna port set, where the first antenna port set includes n antenna ports, and n is a positive integer;

receive a second reference signal through a second antenna port set, where the second antenna port set includes N antenna ports, N is a positive integer, n<N, and the first antenna port set is a proper subset of the second antenna port set; and send channel state information, where content of the channel state information is associated with a rank indicator RI, and the channel state information and the RI are determined based on the second reference signal.

In this embodiment of this application, the terminal device may determine the CSI content based on a value of the RI, and feedback overheads for the channel state information can compromise with feedback precision of the channel state information, to more flexibly determine the content of the channel state channel. Therefore, in this embodiment of this application, accuracy of the channel state information can be improved while the feedback overheads for the channel state information are reduced, thereby improving system performance.

In another embodiment, when RI≤X1, the content of the channel state information includes a channel quality indicator CQI and/or the RI, and the channel state information does not include a precoding matrix indicator PMI; and when RI>X1, the content of the channel state information includes the CQI and/or the RI, and the channel state information further includes the PMI, where X1 is a positive integer less than or equal to N.

In another embodiment, when RI≤X1, the CQI is determined based on the RI and a channel matrix between k antenna ports and the n antenna ports, and the k antenna ports are antenna ports through which the network device sends the second reference signal; and when RI>X1, the CQI is determined based on the RI and the PMI.

In another embodiment, X1=1.

Alternatively, in another embodiment, when RI≤X2, the content of the channel state information includes a CQI and/or the RI, and the channel state information further includes a first PMI; and when RI>X2, the content of the channel state information includes a CQI and/or the RI, and the channel state information further includes a second PMI.

The first PMI and the second PMI are different elements in a first set, each element in the first set represents a different PMI type, the first set includes at least two PMI types in a PMI indicating a channel eigenvector, a PMI indicating a channel vector, a PMI indicating a channel correlation matrix, a codebook-based PMI, an explicit feedback-based PMI, and an implicit feedback-based PMI, and X2 is a positive integer less than or equal to N.

In another embodiment, X2 is equal to P, P is a quantity of antenna ports included in a third antenna port set, the third antenna port set is a proper subset of the second antenna port set, the third antenna port set is different from the first antenna port set, 1≤P≤N−n, and P is an integer; and when 1<RI≤P, the channel state information includes the first PMI, where the first PMI is used to indicate RI eigenvectors of a downlink channel matrix from k antenna ports to the N antenna ports or (n+P) antenna ports, the k antenna ports are antenna ports through which the network device sends the second reference signal, and k is a positive integer.

In another embodiment, when RI≤X2, the CQI is determined based on the RI and the first PMI.

In another embodiment, X2 is equal to P, P is a quantity of antenna ports included in a third antenna port set, the third antenna port set is a proper subset of the second antenna port set, the third antenna port set is different from the first antenna port set, 1≤P≤N−n, and P is an integer; and when RI>P, the channel state information includes the second PMI, the second PMI is used to indicate a channel correlation matrix of a downlink channel matrix from k antenna ports to the P antenna ports, and the k antenna ports are antenna ports through which the network device sends the second reference signal.

In another embodiment, when RI>X2, the CQI is determined based on the RI, the second PMI, a channel matrix between the k antenna ports and the n antenna ports, and the k antenna ports are antenna ports through which the second reference signal is sent; or when RI>P, the channel state information includes the second PMI, the second PMI is used to indicate P channel vectors, each of the P vectors is a downlink channel vector from k antenna ports to one of the P antenna ports, and the k antenna ports are antenna ports through which the second reference signal is sent.

In another embodiment, the first PMI includes base vector indication information and RI groups of linear combination coefficients, where the base vector indication information is used to indicate a group of base vectors, the group of base vectors includes at least two base vectors, and each group of linear combination coefficients is used to perform linear combination on the group of base vectors to represent one eigenvector.

In another embodiment, the second PMI includes base vector indication information and P groups of linear combination coefficients, where the base vector indication information is used to indicate a group of base vectors, the group of base vectors includes at least two base vectors, and each group of linear combination coefficients is used to perform linear combination on the group of base vectors to represent one eigenvector of the channel correlation matrix; or the second PMI includes base vector indication information and P groups of linear combination coefficients, where the base vector indication information is used to indicate a group of base vectors, the group of base vectors includes at least two base vectors, and each group of linear combination coefficients is used to perform linear combination on the group of base vectors to represent one channel vector.

In another embodiment, the transceiver unit is further configured to send fourth indication information, where the fourth indication information is used to indicate related information of P eigenvalues of the channel correlation matrix, and the P eigenvalues are associated with P eigenvectors of the channel correlation matrix.

In another embodiment, the first PMI indicates RI groups of linear combination coefficients, and each group of linear combination coefficients is used to represent one eigenvector.

In another embodiment, the second PMI indicates P groups of channel coefficients, and each group of channel coefficients is used to represent one eigenvector of the channel correlation matrix; or the second PMI indicates P groups of channel coefficients, and each group of channel coefficients is used to represent one channel vector.

In another embodiment, the transceiver unit is further configured to receive a first indication message, where the first indication message is used to indicate the third antenna port set.

In another embodiment, the third antenna port set is a complement set of the first port set, and a union of the third antenna port set and the first port set is the second port set.

In another embodiment, the transceiver unit is further configured to send second indication information, where the second indication information is used to indicate a PMI type of the first PMI or the second PMI; or the second indication information is used to indicate a value of N.

In another embodiment, the transceiver unit is further configured to send third indication information, where the third indication information is used to indicate the k antenna ports.

In another embodiment, the first reference signal is a sounding reference signal SRS.

In another embodiment, the second reference signal is a channel state information-reference signal CSI-RS.

Therefore, in this embodiment of this application, the terminal device may determine the CSI content based on the value of the RI, and the feedback overheads for the channel state information can compromise with the feedback precision of the channel state information, to more flexibly determine the content of the channel state channel. Therefore, in this embodiment of this application, the accuracy of the channel state information can be improved while the feedback overheads for the channel state information are reduced, thereby improving the system performance.

It should be understood that the terminal device 300 shown in FIG. 3 can implement processes related to the terminal device in the method embodiment in FIG. 2. Operations and/or functions of modules in the terminal device 300 are respectively used to implement corresponding procedures in the method embodiment in FIG. 2. For details, refer to the descriptions in the method embodiment. To avoid repetition, detailed descriptions are appropriately omitted herein.

FIG. 4 shows a schematic block diagram of a network device 400 according to an embodiment of this application.

In one embodiment, as shown in FIG. 4, the network device 400 includes a processing unit 410 and a transceiver unit 420.

In one embodiment, the processing unit 410 controls the transceiver unit 420 to receive a first reference signal, where the first reference signal is sent by a terminal device through a first antenna port set, the first antenna port set includes n antenna ports, and n is a positive integer;

send a second reference signal through k antenna ports, where k is a positive integer; and receive channel state information, where content of the channel state information is associated with a rank indicator RI.

Therefore, in this embodiment of this application, the content of the channel state information received by the network device is associated with the rank indicator RI. The channel state information may be flexibly determined by the terminal device based on a value of the RI when a data amount of the channel state information compromises with feedback precision of the channel state information. Therefore, in this embodiment of this application, accuracy of the channel state information can be improved while feedback overheads for the channel state information are reduced, so that the network device can perform precoding based on the channel state information, thereby improving system performance.

In another embodiment, when RI<X1, the content of the channel state information includes a channel quality indicator CQI and/or the RI, and the channel state information does not include a precoding matrix indicator PMI; and when RI>X1, the content of the channel state information includes the CQI and/or the RI, and the channel state information further includes the PMI, where X1 is a positive integer less than or equal to N, N represents a quantity of antenna ports in the second antenna port set through which the terminal device receives the second reference signal, N is a positive integer, n<N, and the first antenna port set is a proper subset of the second antenna port set.

In another embodiment, when RI≤X1, the CQI is determined based on the RI and a channel matrix between the k antenna ports and the n antenna ports; and when RI>X1, the CQI is determined based on the RI and the PMI.

In another embodiment, X1=1.

Alternatively, in another embodiment, when RI≤X2, the content of the channel state information includes a CQI and/or the RI, and the channel state information further includes a first PMI; and when RI>X2, the content of the channel state information includes a CQI and/or the RI, and the channel state information further includes a second PMI.

The first PMI and the second PMI are different elements in a first set, each element in the first set represents a different PMI type, and the first set includes at least two PMI types in a PMI indicating a channel eigenvector, a PMI indicating a channel vector, a PMI indicating a channel correlation matrix, a codebook-based PMI, an explicit feedback-based PMI, and an implicit feedback-based PMI; and X2 is a positive integer less than or equal to N, N represents a quantity of antenna ports in the second antenna port set through which the terminal device receives the second reference signal, N is a positive integer, n<N, and the first antenna port set is a proper subset of the second antenna port set.

In another embodiment, X2 is equal to P, P is a quantity of antenna ports included in a third antenna port set, the third antenna port set is a proper subset of the second antenna port set, the third antenna port set is different from the first antenna port set, 1≤P≤N−n, and P is an integer; and when 1<RI≤P, the channel state information includes the first PMI, where the first PMI is used to indicate RI eigenvectors of a downlink channel matrix from the k antenna ports to the N antenna ports or (n+P) antenna ports.

In another embodiment, when RI≤X2, the CQI is determined based on the RI and the first PMI.

In another embodiment, X2 is equal to P, P is a quantity of antenna ports included in a third antenna port set, the third antenna port set is a proper subset of the second antenna port set, the third antenna port set is different from the first antenna port set, 1≤P≤N−n, and P is an integer; and when RI>P, the channel state information includes the second PMI, where the second PMI is used to indicate a channel correlation matrix of a downlink channel matrix from the k antenna ports to the P antenna ports; or when RI>P, the channel state information includes the second PMI, the second PMI is used to indicate P channel vectors, each of the P vectors is a downlink channel vector from the k antenna ports to one of the P antenna ports.

In another embodiment, when RI>X2, the CQI is determined based on the RI, the second PMI, and a channel matrix between the k antenna ports and the n antenna ports.

In another embodiment, the first PMI includes base vector indication information and RI groups of linear combination coefficients, where the base vector indication information is used to indicate a group of base vectors, the group of base vectors includes at least two base vectors, and each group of linear combination coefficients is used to perform linear combination on the group of base vectors to represent one eigenvector.

In another embodiment, the second PMI includes base vector indication information and P groups of linear combination coefficients, where the base vector indication information is used to indicate a group of base vectors, the group of base vectors includes at least two base vectors, and each group of linear combination coefficients is used to perform linear combination on the group of base vectors to represent one eigenvector of the channel correlation matrix; or the second PMI includes base vector indication information and P groups of linear combination coefficients, where the base vector indication information is used to indicate a group of base vectors, the group of base vectors includes at least two base vectors, and each group of linear combination coefficients is used to perform linear combination on the group of base vectors to represent one channel vector.

In another embodiment, the transceiver unit is further configured to receive fourth indication information, where the fourth indication information is used to indicate related information of P eigenvalues of the channel correlation matrix, and the P eigenvalues are associated with P eigenvectors of the channel correlation matrix.

In another embodiment, the first PMI indicates RI groups of linear combination coefficients, and each group of linear combination coefficients is used to represent one eigenvector.

In another embodiment, the second PMI indicates P groups of channel coefficients, and each group of channel coefficients is used to represent one eigenvector of the channel correlation matrix; or the second PMI indicates P groups of channel coefficients, and each group of channel coefficients is used to represent one channel vector.

In another embodiment, the transceiver unit is further configured to send a first indication message, where the first indication message is used to indicate the third antenna port set.

In another embodiment, the third antenna port set is a complement set of the first port set, and a union of the third antenna port set and the first port set is the second port set.

In another embodiment, the transceiver unit is further configured to receive second indication information, where the second indication information is used to indicate a PMI type of the first PMI or the second PMI; or the second indication information is used to indicate a value of N.

In another embodiment, the transceiver unit is further configured to receive third indication information, where the third indication information is used to indicate the k antenna ports.

In another embodiment, the first reference signal is a sounding reference signal SRS.

In another embodiment, the second reference signal is a channel state information-reference signal CSI-RS.

Therefore, in this embodiment of this application, the content of the channel state information received by the network device is associated with the rank indicator RI. The channel state information may be flexibly determined by the terminal device based on the value of the RI when the data amount of the channel state information compromises with the feedback precision of the channel state information. Therefore, in this embodiment of this application, the accuracy of the channel state information can be improved while the feedback overheads for the channel state information are reduced, so that the network device can perform precoding based on the channel state information, thereby improving system performance.

It should be understood that the network device 400 shown in FIG. 4 can implement processes related to the network device in the method embodiment in FIG. 2. Operations and/or functions of modules in the network device 400 are respectively used to implement corresponding procedures in the method embodiment in FIG. 2. For details, refer to the descriptions in the method embodiment. To avoid repetition, detailed descriptions are appropriately omitted herein.

FIG. 5 is a schematic block diagram of a terminal device 500 according to an embodiment of this application. In one embodiment, as shown in FIG. 5, the terminal device 500 includes a processor 510 and a transceiver 520. The processor 510 is connected to the transceiver 520. In one embodiment, the network device 500 further includes a memory 530. The memory 530 is connected to the processor 510. The processor 510, the memory 530, and the transceiver 520 communicate with each other by using an internal connection path, to transmit control and/or data signals. The memory 530 may be configured to store an instruction. The processor 510 is configured to execute the instruction stored in the memory 530, to control the transceiver 520 to receive and send information or signals. When executing the instruction in the memory 530, the controller 510 can complete the processes of the terminal device in the method embodiment of FIG. 2. To avoid repetition, details are not described herein again.

FIG. 6 is a schematic block diagram of a network device 600 according to an embodiment of this application. In one embodiment, as shown in FIG. 6, the network device 600 includes a processor 610 and a transceiver 620. The processor 610 is connected to the transceiver 620. In one embodiment, the network device 600 further includes a memory 630. The memory 630 is connected to the processor 610. The processor 610, the memory 630, and the transceiver 620 communicate with each other by using an internal connection path, to transmit control and/or data signals. The memory 630 may be configured to store an instruction. The processor 610 is configured to execute the instruction stored in the memory 630, to control the transceiver 620 to receive and send information or signals. When executing the instruction in the memory 630, the controller 610 can complete the processes of the network device in the method embodiment of FIG. 2. To avoid repetition, details are not described herein again.

It should be noted that the method embodiment of the embodiments of this application may be applied to a processor (for example, the processor 510 in FIG. 5 or the processor 610 in FIG. 6), or implemented by the processor. The processor may be an integrated circuit chip and has a signal processing capability. In an embodiment process, operations in the foregoing method embodiments can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logical device, a discrete gate or transistor logic device, or a discrete hardware component. It may implement or perform the methods, the operations, and logical block diagrams that are disclosed in the embodiments of this application. The general purpose processor may be a microprocessor, or the processor may be any conventional processor or the like. Operations of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the operations in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

It should be understood that "an embodiment" or "an embodiment" mentioned in the entire specification means that particular features, structures, or characteristics related to the embodiment are included in at least one embodiment of this application. Therefore, "in an embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only, and B may also be determined according to A and/or other information.

A person of ordinary skill in the art may be aware that, in combination with the examples described in the embodiments disclosed in this specification, units and algorithm operations may be implemented by electronic hardware, computer software, or a combination thereof. To clearly describe the interchangeability between the hardware and the software, the foregoing has generally described compositions and operations of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that this application may be implemented by hardware, firmware or a combination thereof. When the embodiments of the invention are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (Disk) and disc (disc) used by this application includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

What is claimed is:

1. A channel state information transmission method comprising:
sending, by a terminal device, a first reference signal through a first antenna port set, wherein the first antenna port set comprises n antenna ports, and n is a positive integer;
receiving, by the terminal device, a second reference signal through a second antenna port set, wherein the second antenna port set comprises N antenna ports, N is a positive integer, n<N, and the first antenna port set is a proper subset of the second antenna port set; and
sending, by the terminal device, channel state information, wherein content of the channel state information is associated with a rank indicator (RI), and the channel state information and the RI are determined based on the second reference signal, wherein, when RI>X1, the content of the channel state information comprises a channel quality indicator (CQI) and/or the RI, and the channel state information further comprises a precoding matrix indicator (PMI), wherein X1 is a positive integer less than or equal to N.

2. The method according to claim 1, wherein
when RI≤X1, the content of the channel state information comprises a channel quality indicator (CQI) and/or the RI, and the channel state information does not comprise a precoding matrix indicator (PMI).

3. The method according to claim 2, wherein X1=1.

4. The method according to claim 1, wherein
when RI≤X2, the content of the channel state information comprises a CQI and/or the RI, and the channel state information further comprises a first PMI; and
when RI>X2, the content of the channel state information comprises a CQI and/or the RI, and the channel state information further comprises a second PMI, wherein
the first PMI and the second PMI are different elements in a first set, each element in the first set represents a different PMI type, the first set comprises at least two PMI types in a PMI indicating a channel eigenvector, a PMI indicating a channel vector, a PMI indicating a channel correlation matrix, a codebook-based PMI, an explicit feedback-based PMI, and an implicit feedback-based PMI, and X2 is a positive integer less than or equal to N.

5. The method according to claim 4, wherein
X2 is equal to P, P is a quantity of antenna ports comprised in a third antenna port set, the third antenna port set is a proper subset of the second antenna port set, the third antenna port set is different from the first antenna port set, 1<P<N−n, and P is an integer; and
when 1<RI≤P, the channel state information comprises the first PMI, wherein the first PMI is used to indicate RI eigenvectors of a downlink channel matrix from k antenna ports to the N antenna ports or (n+P) antenna ports, the k antenna ports are antenna ports through which a network device sends the second reference signal, and k is a positive integer.

6. The method according to claim 4, wherein
X2 is equal to P, P is a quantity of antenna ports comprised in a third antenna port set, the third antenna port set is a proper subset of the second antenna port set, the third antenna port set is different from the first antenna port set, 1≤P≤N−n, and P is an integer; and
when RI>P, the channel state information comprises the second PMI, the second PMI is used to indicate a channel correlation matrix of a downlink channel matrix from k antenna ports to the P antenna ports, and the k antenna ports are antenna ports through which a network device sends the second reference signal; or
when RI>P, the channel state information comprises the second PMI, the second PMI is used to indicate P channel vectors, each of the P vectors is a downlink channel vector from k antenna ports to one of the P antenna ports, and the k antenna ports are antenna ports through which the second reference signal is sent.

7. The method according to claim 5, wherein
the first PMI comprises base vector indication information and RI groups of linear combination coefficients, wherein the base vector indication information is used to indicate a group of base vectors, the group of base vectors comprises at least two base vectors, and each group of linear combination coefficients is used to perform linear combination on the group of base vectors to represent one eigenvector.

8. The method according to claim 5, wherein
the first PMI indicates RI groups of linear combination coefficients, and each group of linear combination coefficients is used to represent one eigenvector.

9. The method according to claim 6, wherein
the second PMI comprises base vector indication information and P groups of linear combination coefficients, wherein the base vector indication information is used to indicate a group of base vectors, the group of base vectors comprises at least two base vectors, and each group of linear combination coefficients is used to perform linear combination on the group of base vectors to represent one eigenvector of the channel correlation matrix; or
the second PMI comprises base vector indication information and P groups of linear combination coefficients, wherein the base vector indication information is used to indicate a group of base vectors, the group of base vectors comprises at least two base vectors, and each group of linear combination coefficients is used to perform linear combination on the group of base vectors to represent one channel vector.

10. The method according to claim 6, wherein
the second PMI indicates P groups of channel coefficients, and each group of channel coefficients is used to represent one eigenvector of the channel correlation matrix; or
the second PMI indicates P groups of channel coefficients, and each group of channel coefficients is used to represent one channel vector.

11. A terminal device comprising:
a processor,
a receiver,
and a transmitter, wherein
the processor controls the transmitter to send a first reference signal through a first antenna port set, wherein the first antenna port set comprises n antenna ports, and n is a positive integer;
the receiver is configured to receive a second reference signal through a second antenna port set, wherein the second antenna port set comprises N antenna ports, N is a positive integer, n<N, and the first antenna port set is a proper subset of the second antenna port set; and
the transmitter is configured to send channel state information, wherein content of the channel state information is associated with a rank indicator (RI), and the channel state information and the RI are determined based on the second reference signal, wherein, when RI>X1, the content of the channel state information comprises a channel quality indicator (CQI) and/or the RI, and the channel state information further comprises a precoding matrix indicator (PMI), wherein X1 is a positive integer less than or equal to N.

12. The terminal device according to claim 11, wherein
when RI≤X1, the content of the channel state information comprises a channel quality indicator (CQI) and/or the RI, and the channel state information does not comprise a precoding matrix indicator (PMI).

13. The terminal device according to claim 12, wherein X1=1.

14. The terminal device according to claim 11, wherein
when RI≤X2, the content of the channel state information comprises a CQI and/or the RI, and the channel state information further comprises a first PMI; and
when RI>X2, the content of the channel state information comprises a CQI and/or the RI, and the channel state information further comprises a second PMI, wherein
the first PMI and the second PMI are different elements in a first set, each element in the first set represents a different PMI type, the first set comprises at least two PMI types in a PMI indicating a channel eigenvector, a PMI indicating a channel vector, a PMI indicating a channel correlation matrix, a codebook-based PMI, an explicit feedback-based PMI, and an implicit feedback-based PMI, and X2 is a positive integer less than or equal to N.

15. The terminal device according to claim 14, wherein
X2 is equal to P, P is a quantity of antenna ports comprised in a third antenna port set, the third antenna port set is a proper subset of the second antenna port set, the third antenna port set is different from the first antenna port set, 1≤P≤N−n, and P is an integer; and
when 1<RI≤P, the channel state information comprises the first PMI, wherein the first PMI is used to indicate RI eigenvectors of a downlink channel matrix from k antenna ports to the N antenna ports or (n+P) antenna ports, the k antenna ports are antenna ports through which a network device sends the second reference signal, and k is a positive integer.

16. The terminal device according to claim 14, wherein
X2 is equal to P, P is a quantity of antenna ports comprised in a third antenna port set, the third antenna port set is a proper subset of the second antenna port set, the third antenna port set is different from the first antenna port set, 1≤P≤N−n, and P is an integer; and
when RI>P, the channel state information comprises the second PMI, the second PMI is used to indicate a channel correlation matrix of a downlink channel matrix from k antenna ports to the P antenna ports, and the k antenna ports are antenna ports through which a network device sends the second reference signal; or
when RI>P, the channel state information comprises the second PMI, the second PMI is used to indicate P channel vectors, each of the P vectors is a downlink channel vector from k antenna ports to one of the P antenna ports, and the k antenna ports are antenna ports through which the second reference signal is sent.

17. The terminal device according to claim 15, wherein
the first PMI comprises base vector indication information and RI groups of linear combination coefficients, wherein the base vector indication information is used to indicate a group of base vectors, the group of base vectors comprises at least two base vectors, and each group of linear combination coefficients is used to perform linear combination on the group of base vectors to represent one eigenvector.

18. The terminal device according to claim 15, wherein
the first PMI indicates RI groups of linear combination coefficients, and each group of linear combination coefficients is used to represent one eigenvector.

19. The terminal device according to claim 16, wherein
the second PMI comprises base vector indication information and P groups of linear combination coefficients, wherein the base vector indication information is used to indicate a group of base vectors, the group of base vectors comprises at least two base vectors, and each group of linear combination coefficients is used to perform linear combination on the group of base vectors to represent one eigenvector of the channel correlation matrix; or the second PMI comprises base vector indication information and P groups of linear combination coefficients, wherein the base vector indication information is used to indicate a group of base vectors, the group of base vectors comprises at least two base vectors, and each group of linear combination coefficients is used to perform linear combination on the group of base vectors to represent one channel vector.

20. The terminal device according to claim 16, wherein the second PMI indicates P groups of channel coefficients, and each group of channel coefficients is used to represent one eigenvector of the channel correlation matrix; or the second PMI indicates P groups of channel coefficients, and each group of channel coefficients is used to represent one channel vector.

* * * * *

UNITED STATES PATENT AND TRADEMARK OFFICE
CERTIFICATE OF CORRECTION

PATENT NO. : 11,101,955 B2
APPLICATION NO. : 16/579647
DATED : August 24, 2021
INVENTOR(S) : Xueru Li et al.

Page 1 of 1

It is certified that error appears in the above-identified patent and that said Letters Patent is hereby corrected as shown below:

In the Claims

In Claim 5, Column 52, Line 44, "$1 < P < N - n$" should be --$1 \leq P \leq N - n$--.

In Claim 12, Column 53, Line 66, "$R1<X1$" should be --$RI \leq X1$--.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*